United States Patent [19]
Tabata et al.

[11] Patent Number: 5,643,135
[45] Date of Patent: Jul. 1, 1997

[54] APPARATUS FOR CONTROLLING CONCURRENT RELEASING AND ENGAGING ACTIONS OF FRICTIONAL COUPLING DEVICES FOR SHIFTING VEHICLE AUTOMATIC TRANSMISSION

[75] Inventors: Atsushi Tabata, Okazaki; Nobuaki Takahashi, Toyota, both of Japan

[73] Assignee: Toyota Jidosha Kabushiki Kaisha, Toyota, Japan

[21] Appl. No.: 601,156

[22] Filed: Feb. 13, 1996

[30] Foreign Application Priority Data

Feb. 20, 1995 [JP] Japan ................... 7-030668

[51] Int. Cl.$^6$ .................. F16H 61/10; F16H 61/06
[52] U.S. Cl. ................................................. 477/154
[58] Field of Search ........................... 477/154, 155

[56] References Cited

U.S. PATENT DOCUMENTS

| | | | |
|---|---|---|---|
| 5,007,308 | 4/1991 | Narita | 477/155 |
| 5,347,885 | 9/1994 | Taga et al. | 477/65 |
| 5,393,275 | 2/1995 | Okada et al. | 477/81 |
| 5,415,056 | 5/1995 | Tabata et al. | 74/335 |
| 5,425,687 | 6/1995 | Taga et al. | 477/79 |

FOREIGN PATENT DOCUMENTS

| | | |
|---|---|---|
| 62-244726 | 10/1987 | Japan. |
| 63-30640 | 2/1988 | Japan. |

*Primary Examiner*—Dirk Wright
*Attorney, Agent, or Firm*—Oblon, Spivak, McClelland, Maier & Neustadt, P.C.

[57] ABSTRACT

An apparatus for controlling an automatic transmission of a motor vehicle wherein two hydraulically operated frictional coupling devices are released and engaged, respectively, to effect a clutch-to-clutch shift-up action of the transmission, and a shift-up boundary line for determining whether the shift-up action should take place is compensated by a learning shift-point compensating device, so as to prevent a rise of the vehicle engine above an upper limit during the shift-up action effected according to the compensated shift-up boundary line, the apparatus including an inhibiting device for inhibiting an operation of the learning shift-point compensating device if an amount of overshoot of the engine speed detected during the shift-up action is larger than a predetermined threshold. The apparatus may further includes a pressure compensating device for compensating a releasing pressure of the above-indicated one frictional coupling device, and a compensating coordinating device for controlling one of the shift-point and hydraulic pressure compensating devices depending upon an effect achieved or expected to be achieved by the other compensating device.

16 Claims, 18 Drawing Sheets

FIG.2

|      | C0 | C1 | C2 | B0 | B1 | B2 | B3 | B4 | F0 | F1 | F2 |
|------|----|----|----|----|----|----|----|----|----|----|----|
| N    | ○  |    |    |    |    |    |    |    |    |    |    |
| Rev  |    |    | ○  | ○  |    |    |    | ○  |    |    |    |
| 1st  | ○  | ○  |    |    |    |    |    | ●  | ○  |    | ○  |
| 2nd  | ●  | ○  |    |    |    |    | ○  |    | ○  |    |    |
| 3rd  | ○  | ○  |    |    | ●  | ○  |    |    | ○  | ○  |    |
| 4th  | ○  | ○  | ○  |    |    | △  |    |    | ○  |    |    |
| 5th  |    | ○  | ○  | ○  |    | △  |    |    |    |    |    |

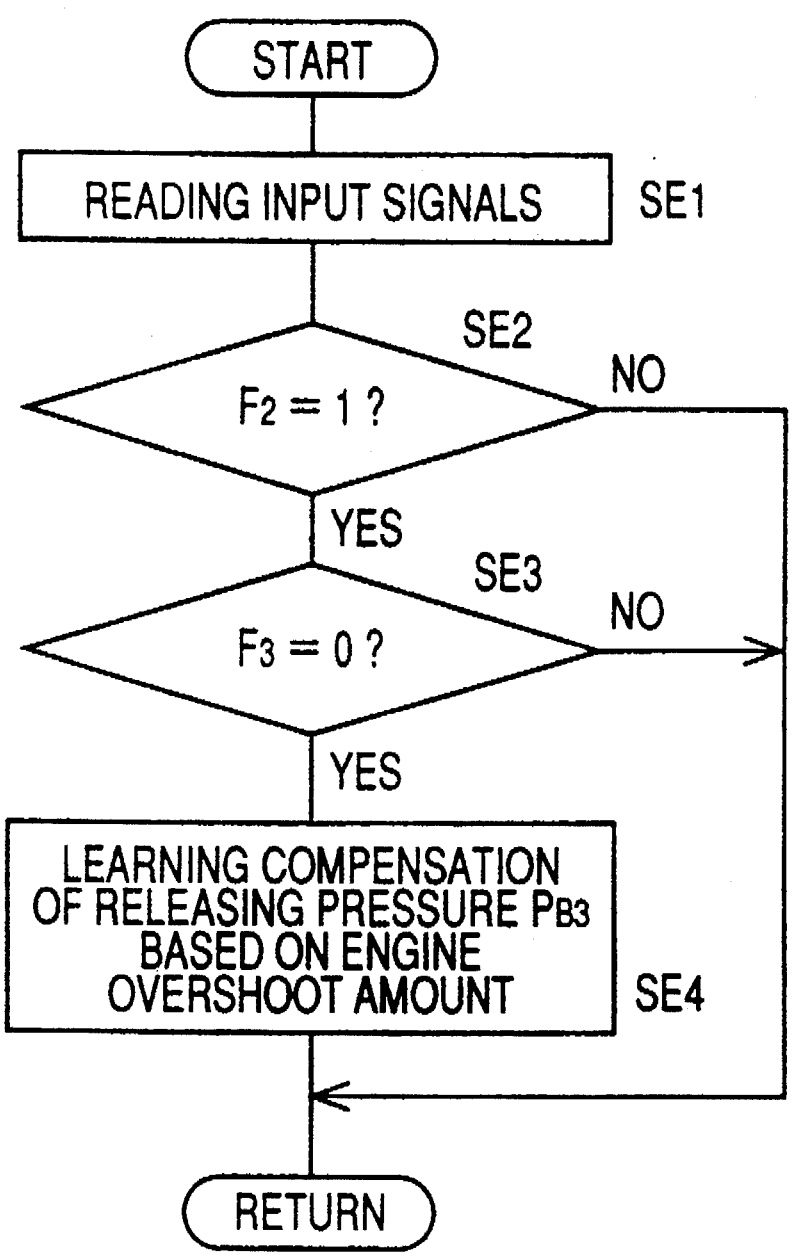

APPARATUS FOR CONTROLLING CONCURRENT RELEASING AND ENGAGING ACTIONS OF FRICTIONAL COUPLING DEVICES FOR SHIFTING VEHICLE AUTOMATIC TRANSMISSION

BACKGROUND OF THE INVENTION

1. Field of the invention

The present invention relates to a transmission shift control apparatus for controlling an automatic transmission of a motor vehicle.

2. Discussion of the Related Art

In the field of a motor vehicle, there is known an automatic transmission which has planetary gear sets and a plurality of frictional coupling devices such as clutches and brakes and in which selected ones of the frictional coupling devices are engaged to connect selected elements of the planetary gear sets to each other or to stationary members, to thereby selectively establish speed or gear positions (operating positions) of the transmission. In such an automatic transmission, predetermined shift patterns are stored in a memory and used to determine whether the transmission should be shifted up or down from the presently established operating position to another. Each shift pattern is determined in relation to the actual running condition of the vehicle, with the drivability and fuel economy of the vehicle being taken into account. For example, the shift pattern consists of a shift boundary line determined as a function of the running condition of the vehicle. For instance, the shift boundary line represents a predetermined relationship between the running speed of the vehicle and a currently detected opening angle of a throttle valve or other parameter indicative of the current load acting on a vehicle engine. In this instance, the automatic transmission is shifted from one operating position to another on the basis of the detected vehicle speed and throttle opening angle and according to the predetermined shift boundary line, such that an appropriate shifting action of the transmission takes place if a point representing the detected running condition (vehicle speed and throttle opening angle) is moved across the shift boundary line.

The shift boundary line for shifting up the transmission (shift-up boundary line) is usually determined such that when the throttle opening angle is relatively close to its largest value (100% opening), a shift-up action of the transmission is initiated immediately before the engine speed has been raised to a predetermined upper limit, so that the drivability of the vehicle is maximum at an opening angle of the throttle valve close to the largest value.

Generally, the automatic transmission has a certain length of shift response time, namely, a time delay from the moment at which the transmission is commanded to be shifted to the moment at which a shifting action of the transmission is actually initiated. During this shift response time period, the engine speed tends to vary due to a change in the temperature or pressure of the intake air (which may be fed from a supercharger), and may rise above the permissible highest level or upper limit during the shift-up action of the transmission. In view of this drawback, there has been proposed to provide the shift control apparatus with a learning shift-point compensating device as disclosed in JP-A-63-30640, which is adapted to effect learning compensation or adjustment of the shift-up boundary line to change the shift-up boundary speed of the vehicle, so that the engine speed which varies during the shift-up action of the transmission is held below a predetermined upper limit. This learning compensation or adjustment is effected if the highest or peak value of the varying engine speed during the shift-up action is outside a predetermined permissible range. The compensated shift-up boundary is stored in a memory and subsequently used to determine whether the same shift-up action of the transmission should take place.

The automatic transmission usually employs a one-way clutch which permits a shifting action to establish a given gear position by engaging or releasing an appropriate hydraulically operated frictional coupling device. However, the automatic transmission may be adapted to effect a so-called "clutch-to-clutch shift" to establish a certain gear position, without using a one-way clutch. The clutch-to-clutch shift is achieved such that one and the other of two hydraulically operated frictional coupling devices are concurrently released and engaged, respectively, to shift the transmission from one operating gear position to another. This arrangement makes it possible to reduce the size and weight of the transmission, owing to the elimination of the one-way clutch. In the clutch-to-clutch shift of the transmission, the releasing pressure of the above-indicated one frictional coupling device or the engaging pressure of the above-indicated other frictional coupling device is regulated so that both of the two frictional coupling devices temporarily have engaging torques during a suitable period of time of the clutch-to-clutch shift.

If the timing of decreasing the engaging torque of one of the two frictional coupling devices and the timing of increasing the engaging torque of the other frictional coupling device are not suitably matched, the motor vehicle will suffer from some problems. For example, the speed of the vehicle engine will have a temporary overshoot if the rate of decrease of the engaging torque of the frictional coupling device to be eventually released is excessively high or if the rate of increase of the frictional coupling device to be eventually engaged is excessively low. Alternatively, the automatic transmission will have a so-called "tie-up", namely, an abrupt temporary drop in its output torque, if the rate of decrease of the engaging torque of the frictional coupling device to be released is excessively low or if the rate of increase of the engaging torque of the other frictional coupling device is excessively high. Thus, the engine speed may suffer from an excessive rise during the shift response time period due to an excessively high rate of decrease of the releasing pressure of the coupling device that should be eventually released, or due to an influence of a control system for controlling the coupling device in question. Therefore, where the transmission shift control apparatus is provided with the learning shift-point compensating device, the operation of this device to change the shift-up boundary line so as to maintain the engine speed below the upper limit tends to be difficult and unstable.

The transmission shift control apparatus may be provided with a learning hydraulic pressure compensating device adapted to effect learning compensation or adjustment of the hydraulic pressure or pressures of the frictional coupling device or devices so as to permit the clutch-to-clutch shift of the transmission to be smoothly achieved, without an excessive amount of engine overshoot or or an excessive amount of tie-up of the frictional coupling devices. The operation of this learning hydraulic pressure control device may cause a change of the engine speed or engine overshoot amount during the clutch-to-clutch shift of the transmission in which the hydraulic pressure is compensated by the learning hydraulic pressure control device. This change of the engine speed or engine overshoot amount may also cause unstable operation of the learning shift-point compensating device.

SUMMARY OF THE INVENTION

It is therefore a first object of the present invention to provide a transmission shift control apparatus for a motor vehicle, which is adapted to effect a clutch-to-clutch shift and provided with a learning shift-point compensating device and which assures a stable operation of the learning shift-point compensating device during the clutch-to-clutch shift.

The above object may be achieved according to a first aspect of the present invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift-up action of the transmission from one of the operating positions to another of the operating positions, the shift control apparatus comprising (a) learning shift-point compensating means for effecting learning compensation of a shift-up boundary line used for determining whether the clutch-to-clutch shift-up action should take place, so that a speed of the engine does not exceed a predetermined upper limit during the clutch-to-clutch shift-up action if the shift-up action takes place according to the compensated shift-up boundary line; (b) engine overshoot detecting means for detecting an amount of overshoot of the speed of the engine during the clutch-to-clutch shift-up action of the automatic transmission; and (c) inhibiting means for determining whether the amount of overshoot of the speed of the engine is larger than a predetermined threshold, and inhibiting an operation of the learning shift-point compensating means if the amount of overshoot is larger than the predetermined threshold.

In the vehicle transmission shift control apparatus of the present invention constructed as described above, the operation of the learning shift-point compensating means is inhibited by the inhibiting means if the inhibiting means determines that the amount of overshoot of the engine speed detected by the engine overshoot detecting means has exceeded the predetermined threshold.

As described above, the present shift control apparatus is adapted to inhibit the operation of the learning shift-point compensation to effect the learning compensation of the shift-up boundary line when the detected amount of engine speed overshoot is larger than the threshold value. This arrangement prevents an undesirable operation of the learning shift-point compensating means when the engine overshoot amount is comparatively large due to an excessive amount of rise of the engine speed during the period of shift response time of the automatic transmission, which excessive amount of rise may arise from an excessively high rate of decrease in the releasing pressure of the above-indicated one frictional coupling device during the clutch-to-clutch shift-up action or an influence of the control system for controlling that frictional coupling device. In other words, the learning shift-point compensating means is operated only when the engine overshoot amount during the shift-up action of the transmission is smaller than the threshold. Therefore, the learning compensation of the shift-up boundary line by the learning shift-point compensating means can be achieved with high stability without an adverse influence of the comparatively large engine overshoot during the clutch-to-clutch shift-up action of the transmission.

Further, since the operation of the learning shift-point compensating means is inhibited if the engine overshoot amount during the clutch-to-clutch shift-up action of the transmission is larger than the predetermined threshold, as described above, the learning compensation of the shift-up boundary line by the learning shift-point compensating means is not adversely influenced by a change of the engine speed by an operation of hydraulic pressure compensating means, which may be optionally or preferably provided to compensate at least one of a releasing pressure of the above-indicated one frictional coupling device and an engaging pressure of the above-indicated other frictional coupling device during the clutch-to-clutch shift-up action of the transmission so that the amount of engine overshoot or the amount of tie-up of the two frictional coupling devices is reduced to within a predetermined permissible or optimum range.

The above object may also be achieved according to a second aspect of the present invention, which provides a shift control apparatus for controlling an automatic transmission of a motor vehicle having an engine, the transmission having a plurality of operating positions and including two hydraulically operated frictional coupling devices one and the other of which are released and engaged, respectively, to effect a clutch-to-clutch shift-up action of the transmission from one of the operating positions to another of the operating positions, the shift control apparatus comprising: (a) learning shift-point compensating means for effecting learning compensation of a shift-up boundary line used for determining whether the clutch-to-clutch shift-up action should take place, so that a speed of the engine does not exceed a predetermined upper limit during the clutch-to-clutch shift-up action if the shift-up action takes place according to the compensated shift-up boundary line; (b) hydraulic pressure compensating means for compensating a releasing pressure of the one frictional coupling device so as to permit the clutch-to-clutch shift-up action of the automatic transmission to be effected smoothly; and (c) compensating coordinating means for controlling one of the learning shift-point compensating means and the hydraulic pressure compensating means depending upon an operation of the other of the learning shift-point compensating means and the hydraulic pressure compensating means.

In the vehicle transmission shift control apparatus constructed according to the second aspect of this invention as described above, an operation of one of the learning shift-point compensating means and the hydraulic pressure compensating means is controlled by the compensation coordinating means depending upon or in relation to an operation of the other of these two compensating means, that is, depending upon an effect achieved or expected to be achieved by the other compensating means. For instance, the compensation coordinating means may be adapted such that the learning shift-point compensating means is operated so as to effect the learning compensation of the shift-up boundary line by an amount of change of the amount of overshoot of the engine speed which amount of change is expected to occur by learning compensation of the releasing pressure of the above-indicated one friction coupling device by the hydraulic pressure compensating means. The compensation coordinating means may be adapted to determine whether the compensation by the hydraulic pressure compensating means is possible, and command the learning shift-point compensating means to operate if the compensation by the hydraulic pressure compensating means is not possible. Alternatively, the compensation coordinating means may be adapted to initiate an operation of one of the learning shift-point compensating means and the hydraulic pressure compensating means when an operation of the other compensating means has been terminated.

Since the compensating coordinating means controls an operation of one of the shift-point and hydraulic pressure compensating means depending upon an operation of the other compensating means, the shift control apparatus does not suffer from a control interference between the compensation of the hydraulic pressure of the relevant frictional coupling device by the hydraulic pressure compensating means and the learning compensation of the shift-up boundary line by the learning shift-point compensating means, which control interference would occur if these two compensating means were operated independently of each other. Accordingly, the compensation of the shift-up boundary line by the learning shift-point compensating means can be effected with improved stability and reliability.

BRIEF DESCRIPTION OF THE DRAWINGS

The above and optional objects, features, advantages and technical and industrial significance of the present invention will be better understood by reading the following detailed description of a presently preferred embodiment of the invention, when considered in connection with the accompanying drawings, in which:

FIG. 2 is a view indicating a relationship between operating positions of the automatic transmission of FIG. 1 and respective combinations of operating states of a plurality of frictional coupling devices incorporated in the automatic transmission;

FIG. 19 is a flow chart illustrating another part of the operation of the transmission controller of FIG. 17.

DETAILED DESCRIPTION OF THE PREFERRED EMBODIMENTS

Figure 1:
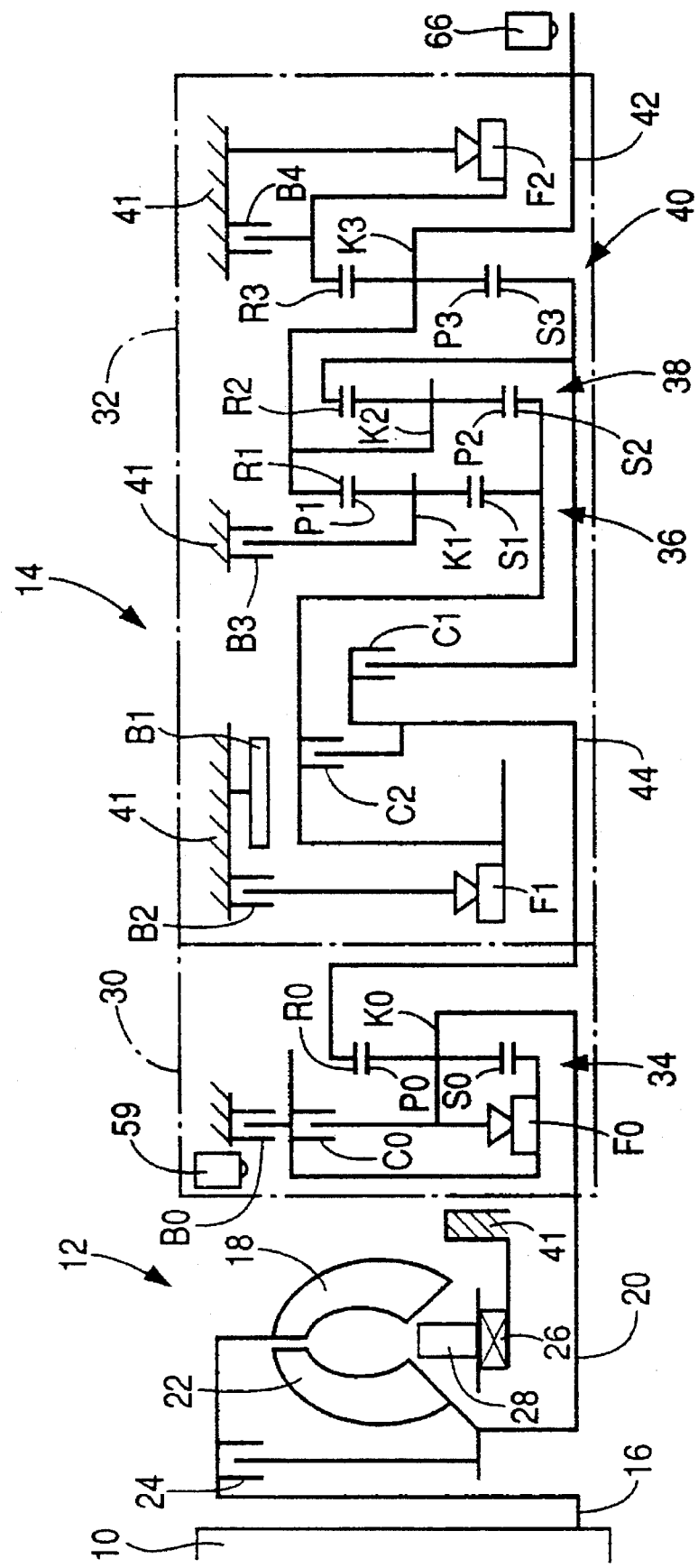
FIG. 1 is a schematic view showing a power transmitting system of a motor vehicle including an automatic transmission whose shifting actions are controlled by a shift control apparatus constructed according to one embodiment of this invention.

Referring first to the schematic view of FIG. 1, there is illustrated an example of a power transmitting system of a motor vehicle, which is shifted under control of a shift control apparatus according to one embodiment of the present invention. The vehicle has an engine 10 whose output is transmitted through a torque converter 12 to an automatic transmission 14. An output of the automatic transmission 14 is transmitted to drive wheels of the vehicle through a differential gear and an axle, as well known in the art.

The torque converter 12 is provided with a pump impeller 18 connected to a crankshaft 16 of the engine 10, a turbine runner 22 connected to an input shaft 20 of the automatic transmission 14, a lock-up clutch 24 for directly connecting the pump impeller 18 and the turbine runner 22, and a stator 28 which is prevented by a one-way clutch 26 from rotating in one direction.

The automatic transmission 14 includes a first transmission unit 30 having a high-speed position and a low-speed position that are selectively established, and a second transmission unit 32 having one rear drive position and four forward drive positions that are also selectively established. The first transmission unit 30 includes a HL planetary gear set 34 consisting of a sun gear S0, a ring gear R0, a carrier K0 and a planetary gear P0 which is rotatably supported by the carrier K0 and which meshes with the sun gear S0 and the ring gear R0. The first transmission unit 30 further includes a clutch C0 and a one-way clutch F0 which are disposed between the sun gear S0 and the carrier K0, and a brake B0 disposed between the sun gear S0 and a housing 41.

The second transmission unit 32 includes a first planetary gear set 36, a second planetary gear set 38 and a third planetary gear set 40. The first planetary gear set 36 consists of a sun gear S1, a ring gear R1, a carrier K1, and a planetary gear P1 which is rotatably supported by the carrier K1 and which meshes with the sun gear S1 and the ring gear R1. The second planetary gear set 38 consists of a sun gear S2, a ring gear R2, a carrier K2, and a planetary gear P2 which is rotatably supported by the carrier K2 and which meshes with the sun gear S2 and the ring gear R2. The third planetary gear set 40 consists of a sun gear S3, a ring gear R3, a carrier K3, and a planetary gear P3 which is rotatably supported by the carrier K3 and which meshes with the sun gear S3 and the ring gear R3.

The sun gears S1 and S2 are integrally connected to each other, while the ring gear R1, carrier K2 and carrier K3 are integrally connected to each other. The carrier K3 is connected to an output shaft 42 of the automatic transmission 14. The ring gear R2 and the sun gear S3 are integrally connected to each other. A clutch C1 is disposed between the integrally connected ring gear R2 and sun gear S3 and an intermediate shaft 44, while a clutch C2 is disposed between the integrally connected sun gears S1, S2 and the intermediate shaft 44. Further, a band brake B1 is provided on the housing 41 for inhibiting rotation of the sun gears S1, S2, and a one-way clutch F1 and a brake B2 are disposed in series connection with each other between the integrally connected sun gears S1, S2 and the housing 41. This one-way clutch F1 is engaged when a torque is applied to the sun gears S1, S2 so as to rotate these sun gears in a direction opposite to the direction of rotation of the input shaft 20.

A brake B3 is disposed between the carrier K1 and the housing 41, while a brake B4 and a one-way clutch F2 are disposed in parallel connection with each other between the ring gear R3 and the housing 41. This one-way clutch F2 is engaged when a torque is applied to the ring gear R3 so as to rotate the ring gear R3 in a direction opposite to the direction of rotation of the input shaft 20.

The automatic transmission 14 constructed as described above is shifted from one of six operating positions to another, by suitably selectively engaging and releasing the clutches C0–C2, brakes B0–B4 and one-way clutches F0–F2 as indicated in FIG. 2. The six operating positions of the transmission 14 consist of one rear drive position "Rev", and five forward drive positions "1st", "2nd", "3rd", "4th" and "5th" having different speed reduction ratios. In FIG. 2, white circles in the rectangular blocks indicate the engaged state of the appropriate clutch, brake or one-way clutch in normal running of the vehicle, and blanks in the blocks indicate the released state of the appropriate clutch, brake or one-way clutch. Further, black circles in the blocks indicate the engaged state of the clutch C0 and the brakes B1 and B4 during running of the vehicle in an engine-brake mode in which a torque is transmitted from the drive wheels to the engine 10 through the power transmitting system. It will be understood from FIG. 2 that the brake B3 is engaged for shifting up the automatic transmission 14 from the first-speed position (first gear) "1st" to the second-speed position (second gear) "2nd", and is released for shifting up the transmission 14 from the second-speed position "2nd" to the third-speed position (third gear) "3rd", while the brake B2 is engaged for shifting up the transmission 14 from the second-speed position "2nd" to the third-speed position "3rd". Therefore, when the transmission 14 is shifted up from the second-speed position "2nd" to the third-speed position "3rd", the brake B3 is released while at the same time the brake B2 is engaged. Thus, the shifting actions of the transmission 14 from the second-speed position "2nd" to the third-speed position "3rd" and vice versa are examples of the so-called "clutch-to-clutch shift" of the automatic transmission 14. The other shifting actions of the transmission 14 are accomplished by an engaging or releasing action of one clutch or brake. In the present embodiment, the principle of the invention is applied to only the clutch-to-clutch shift from the second-speed position to the third-speed position, since this shift conventionally suffers from the problems discussed below.

Figure 3:
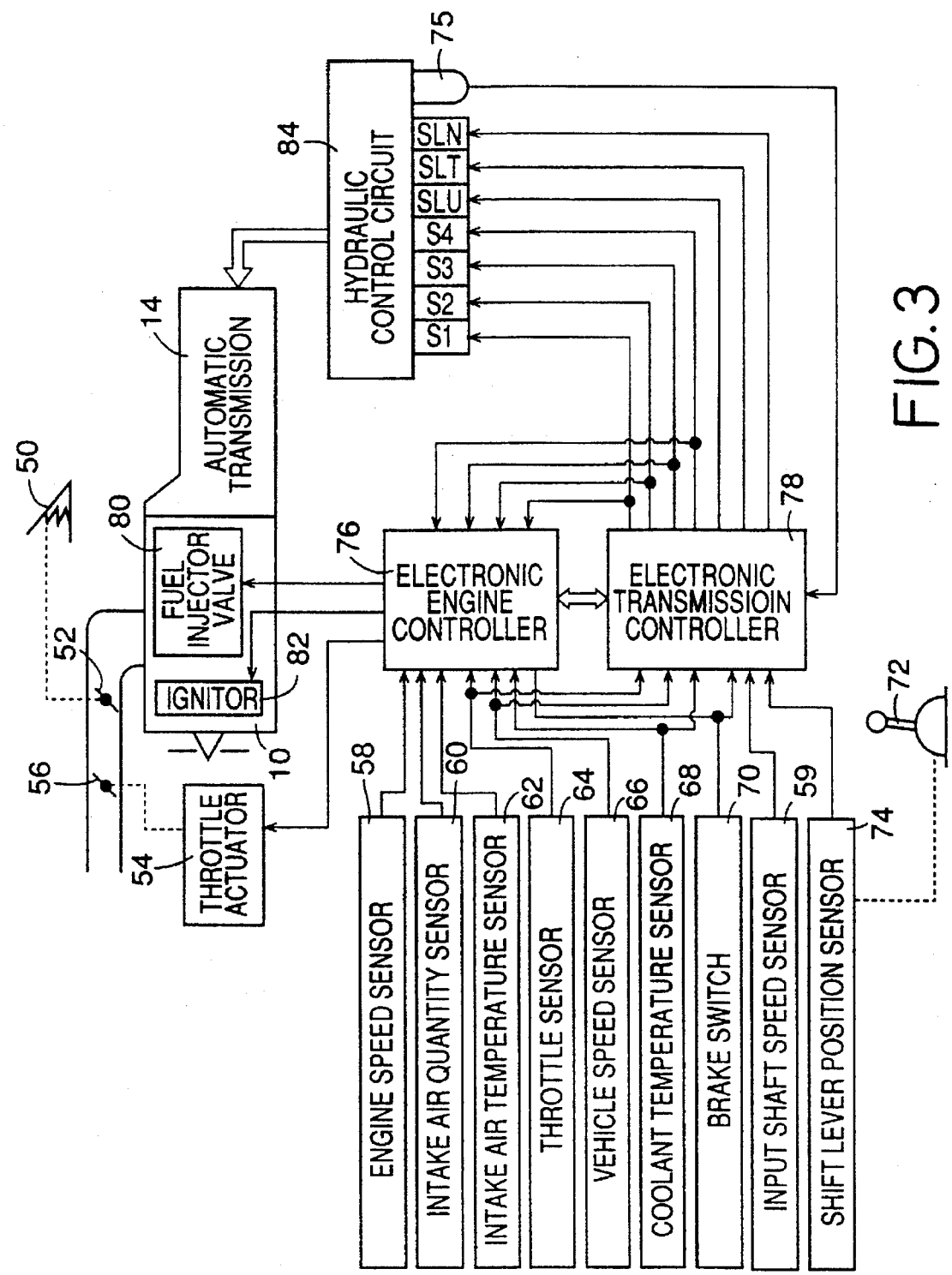
FIG. 3 is a block diagram showing a hydraulic and an electronic control system for controlling the power transmitting system and an engine of the vehicle.

As shown in FIG. 3, the engine 10 is provided with an intake pipe in which there are disposed a first throttle valve 52 manually operated by an accelerator pedal 50, and a second throttle valve 56 automatically operated by a throttle actuator 54. The engine 10 provided with the throttle actuator 54, a fuel injector valve 80 and an ignitor 82 is controlled by an electronic engine controller 76, while the automatic transmission 14 is controlled by an electronic transmission controller 78 through a hydraulic control circuit 84. These electronic controllers 76, 78 are adapted to receive output signals of various sensors such as: an engine speed sensor 58 for detecting a speed $N_E$ of the engine 10; an input shaft speed sensor 59 for detecting a speed of the input shaft 20 of the transmission 14, that is, a speed $N_{CO}$ of the clutch C0; an intake air quantity sensor 60 for detecting an intake air quantity Q of the engine 10; an intake air temperature sensor 62 for detecting a temperature $T_A$ of an intake air supplied to the engine 10; a throttle sensor 64 for detecting an opening angle $\theta_{TH}$ of the first throttle valve 52; a vehicle speed sensor 66 for detecting a running speed V of the vehicle on the basis of a rotating speed $N_{OUT}$ of the output shaft 42 of the automatic transmission 14; a coolant temperature sensor 68 for detecting a temperature $T_W$ of a coolant water of the engine 10; a brake switch 70 for detecting an operated state BK of a brake pedal for brake application to the vehicle; and a shift lever position sensor 74 for detecting a selected position $P_{SH}$ of a shift lever 72 for the automatic transmission 14. The transmission controller 78 also receives an output signal of an oil temperature sensor 75 indicative of a temperature $T_{OIL}$ of a working oil in the hydraulic control circuit 84.

Figure 4:
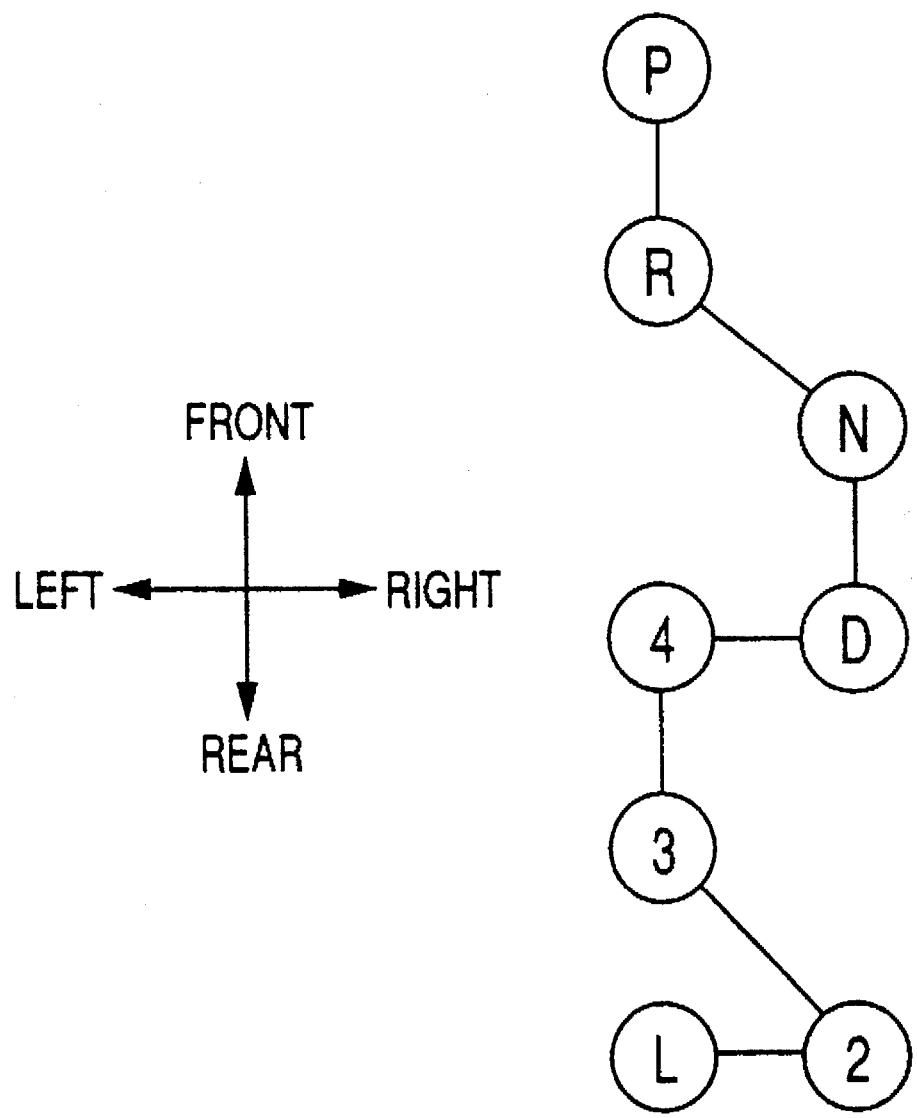
FIG. 4 is a view showing operating positions of a shift lever provided on the vehicle as shown in FIG. 3.

The shift lever 72 has a total of eight operating positions, namely, PARKING "P", REVERSE "R", NEUTRAL "N", DRIVE "D", FOURTH "4", THIRD "3", SECOND "2" and LOW "L". These positions are selected by operating the shift lever 72 in the longitudinal (front and rear) and transverse (right and left) directions of the vehicle, as indicated in FIG. 4. The shift lever 72 is supported by a suitable mechanism such that the positions "D" and "4" are alternately selected by moving the shift lever 72 in the right and left directions. Similarly, the positions "2" and "L" are alternately selected by moving the shift lever 72 in the right and left directions.

The electronic engine controller 76 is a so-called microcomputer incorporating a central processing unit (CPU), a random-access memory (RAM), a read-only memory (ROM), and an input and output interface. The CPU operates to process the input signals and produce output signals for controlling the engine 10, according to control programs stored in the ROM, while utilizing a temporary data storage function of the RAM. For instance, the engine controller 76 controls the fuel injector valve 80 for controlling a fuel supply to the engine 10, and controls the ignitor 82 for controlling the ignition timing of the engine 10. The engine controller 76 also controls a by-pass valve (not shown) for controlling an idling speed of the engine 10, and controls the throttle actuator 54 for controlling the second throttle valve 56 to effect a traction control of the drive wheels. The engine controller 76 is also adapted to effect a fuel cut by closing the fuel injector valve 80 when the engine speed $N_E$ exceeds a predetermined upper limit. The engine controller 76 and the transmission controller 78 are connected to each other for interactive communication or data transfer, so that the input signals required by one of these two controllers 76, 78 may be received from the other controller.

Figure 9:
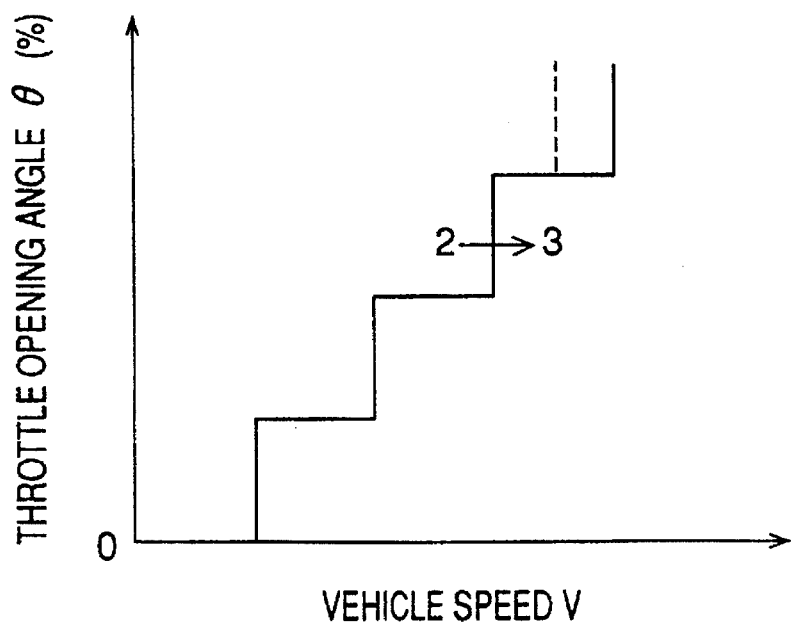
FIG. 9 is a graph indicating a shift-up boundary line as changed by learning shift-point compensating means shown in FIG. 8.

Like the engine controller 76, the transmission controller 78 is a microcomputer whose CPU operates to process the input signals and produce output signals for controlling various solenoid-operated valves and linear solenoid valves of the hydraulic control circuit 84 to control the automatic transmission 14, according to control programs stored in a ROM, while utilizing a temporary data storage function of a RAM. The linear solenoid valves include: a linear solenoid valve SLT for generating a THROTTLE pressure $P_{TH}$ corresponding to the opening angle $\theta_{TH}$ of the first throttle valve 52; a linear solenoid valve SLN for controlling an accumulator back pressure; and a linear solenoid valve SLU for fully engaging or releasing the lock-up clutch 24 or partially engaging the lock-up clutch 24 in a slip control fashion, and for effecting the clutch-to-clutch shift of the transmission 14, for example, for shifting up the transmission 14 from the second-speed position "2nd" to the third-speed position "3rd". The solenoid-operated valves include valves S1–S4. The transmission controller 78 selects one of the operating positions of the automatic transmission 14 and selects the engaged or released state of the lock-up clutch 24, on the basis of the detected throttle opening angle $\theta_{TH}$ and vehicle speed V, and according to predetermined shift patterns stored in the ROM. The shift patterns are relationships between the throttle opening angle $\theta_{TH}$ and the vehicle speed V. The solenoid-operated valves S1, S2, S3 are controlled so as to shift the transmission 14 to the selected position, while the solenoid-operated valve S4 is controlled so as to place the lock-up clutch 24 in the selected state. The solenoid-operated valve S4 is activated when the engine brake is applied to the vehicle. The shift patterns indicated above correspond to the respective positions of the transmission 14 which are to be established by a shifting action. FIG. 9 shows an example of the shift-up boundary line used for determining whether the transmission 14 should be shifted up from the second-speed position "2nd" to the third-speed position "3rd", that is, whether the clutch-to-clutch shift-up action of the transmission 14 should be effected.

Figure 5:
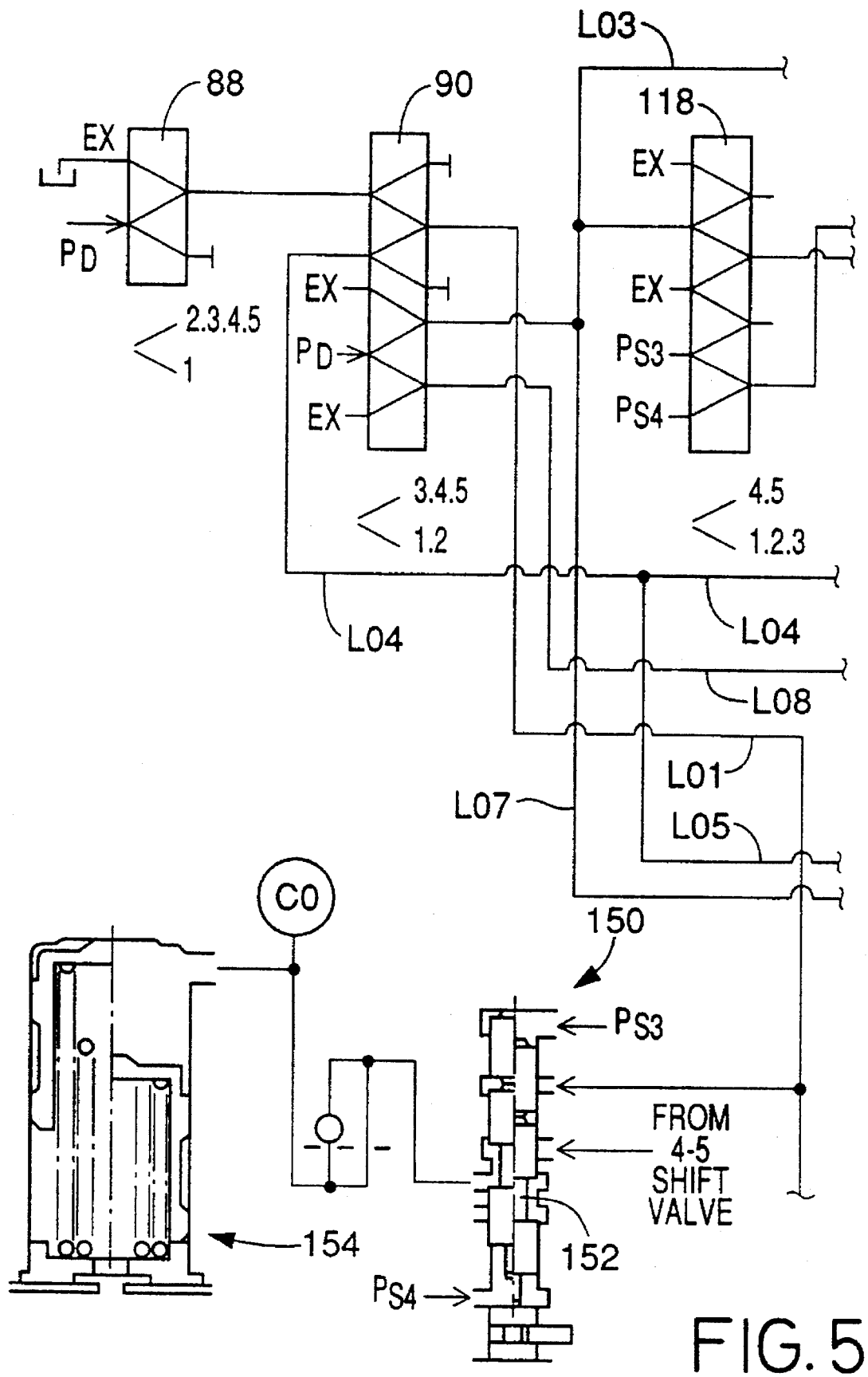
FIG. 5 is a fragmentary view illustrating a part of the hydraulic control system shown in FIG. 3.
Figure 6:
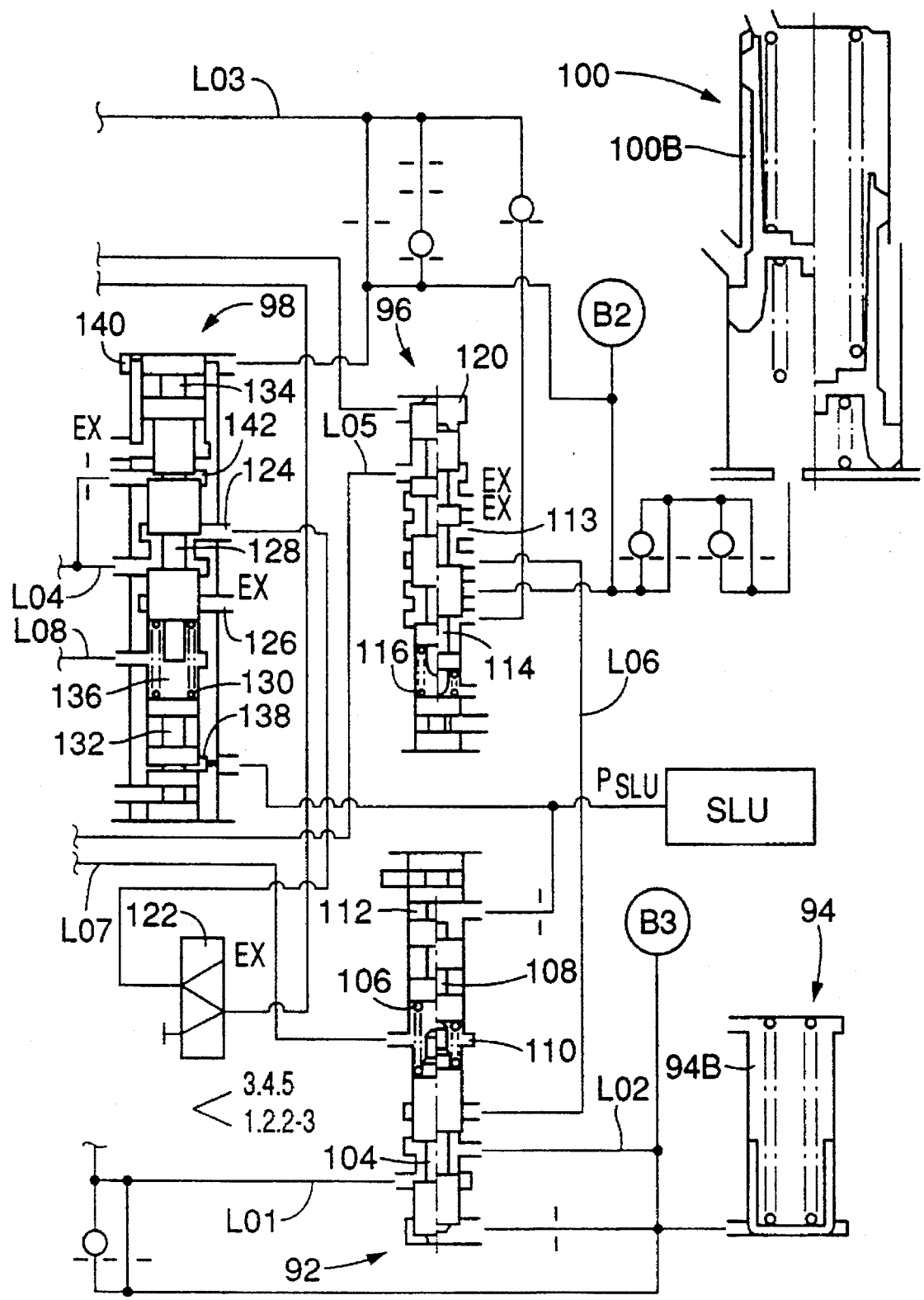
FIG. 6 is a fragmentary view illustrating another part of the hydraulic control system.

Referring to FIGS. 5 and 6, there will be described the hydraulic control circuit 84, which includes a 1–2 shift valve 88 and a 2–3 shift valve 90 which are operated according to output pressures of the solenoid-operated valves S1 and S2, for shifting up the transmission 14 from the first-speed position to the second-speed position, and from the second-speed position to the third-speed position, respectively. In FIG. 5, numerals given below the shift valves 88 and 90 indicate the positions of the transmission 14 to be selected when the corresponding positions of the valves 88, 90 are selected. A FORWARD pressure $P_D$ is generated by a manual valve (now shown) when the shift lever 72 is placed in one of the forward drive positions "D", "4", "3", "2" and "L". The FORWARD pressure $P_D$ is controlled on the basis of a LINE pressure $P_L$ which is regulated by a pressure regulating valve (not shown) so as to be increased with an increase in the throttle opening angle $\theta_{TH}$.

When the transmission controller 78 generates a command for shifting up the automatic transmission 14 from the first-speed position to the second-speed position, the FORWARD pressure $P_D$ is applied to the brake B3 and a B3 accumulator 94 through the 1–2 shift valve 88, 2–3 shift valve 90, a line L01, a B3 control valve 92 and a line L02. When the transmission controller 78 generates a command for shifting up the automatic transmission 14 from the second-speed position to the third-speed position, the FORWARD pressure $P_D$ is applied to the brake B2 and a B2 accumulator 100 through the 2–3 shift valve 90 and a line L03, while at the same the working fluid in the brake B3 and B3 accumulator 94 is drained through the line L02, B3 controller valve 92, line L01, 2–3 shift valve 90, a return line L04 and a 2–3 timing valve 98, with the pressure of the fluid being suitably controlled, and the fluid is rapidly drained through a branch line L05 extending from the return line L04, and through a B2 orifice control valve 96 to which the branch line L05 is connected.

The B3 accumulator 94 and the B2 accumulator 100 have respective back pressure chambers 94B and 100B which receive an accumulator back pressure $P_{ACC}$ from accumulator back pressure control valves (not shown), which generate the pressure $P_{ACC}$ on the basis of an output pressure $P_{SLT}$ of the linear solenoid valve SLT and an output pressure $P_{SLN}$ of the linear solenoid valve SLN, respectively, when the transmission 14 is shifted from the first-speed position to the second-speed position or from the second-speed position to the third-speed position.

As shown in FIG. 6, the B3 control valve 92 has: a spool 104 for connection and disconnection between the lines L01 and L02; a spring 106 biasing the spool 104; a plunger 108 which is disposed concentrically with the spool 104 on one side of the spring 106 remote from the spool 104 and which has a larger diameter than the spool 104; a pressure chamber 110 in which the spring 106 is accommodated and which is adapted to receive the FORWARD pressure $P_D$ through a line L07 when the pressure $P_D$ is generated from the 2–3 shift valve 90 upon operation thereof to a position corresponding to the third-speed position of the transmission 14; and a pressure chamber 112 which is partially defined by the end face of the plunger 108 remote from the spring 106 and which is adapted to receive the output pressure $P_{SLU}$ of the linear solenoid valve SLU. To establish the second-speed position of the transmission 14, the spool 104 of the B3 control valve 92 is initially moved to an open position (fast fill position) indicated on the left side of its centerline as shown in FIG. 6, by the output pressure $P_{SLU}$ of the linear solenoid valve SLU. Then, an engaging pressure $P_{B3}$ in the brake B3 is regulated according to the following equation (1) on the basis of the output pressure $P_{SLU}$, by feeding the fluid from the line L01 to the line L02 or by discharging the fluid from the line L02 to a drain line L06.

$$P_{B3} = P_{SLU} \cdot S_1 / S_2 \qquad (1)$$

where,
$S_1$: cross sectional area of the plunger 108,
$S_2$: cross sectional area of the spool 104

When the transmission 14 is placed in the third-speed position or any one of its positions whose speed reduction ratio is lower than that of the third-speed position, the spool 104 of the B3 control valve 92 is locked in the open position indicated above, by the FORWARD pressure $P_D$ applied from the 2–3 shift valve 92 to the pressure chamber 110. This arrangement prevents a change in the volume of the pressure chamber 112 of the B3 control valve 92 to thereby avoid an influence of that volume change on the pressure regulating operation of the 2–3 timing valve 98 during the shifting of the transmission 14 from the second-speed position to the third-speed position, even though the pressure chamber 112 of the B3 control valve 92 communicates with a pressure chamber 138 of the 2–3 timing valve 98.

The B2 orifice control valve 96 has: a spool 114 for connection and disconnection between the brake B2 and B2 accumulator 100 and the line L03 and between the drain line L06 and a drain port 113; a spring 116 for biasing the spool 114 toward a fast drain position thereof; and a pressure chamber 120 which is partially defined by the end face of the spool 114 remote from the spring 116 and which is adapted to receive an output pressure $P_{S3}$ of the third solenoid-operated valve S3 through a 3–4 shift valve 118. When the transmission 14 is shifted down from the third-speed position to the second-speed position, for example, the third solenoid-operated valve S3 is turned on and its output pressure $P_{S3}$ is not applied to the pressure chamber 120, so that the spool 114 is moved to the first drain position in which the brake B2 and B2 accumulator 100 are communicated with the line L03, whereby the brake B2 and B2 accumulator 100 are rapidly drained. When the transmission 14 is shifted up from the first-speed position to the second-speed position, the third solenoid-operated valve S3 is turned off to apply the output pressure $P_{S3}$ to the pressure chamber 120 of the B2 orifice control valve 96, and the drain port 113 is communicated with the drain line L06, whereby the B3 control valve 92 is permitted to regulate the pressure in the brake B3. Upon completion of the shifting of the transmission 14 from the first-speed position to the second-speed position, the third solenoid-operated valve S3 is turned on to disconnect the drain port 113 from the drain line L06, whereby the B3 control valve 92 is inhibited from operating to control the pressure in the brake B3.

The 2–3 timing valve 98 is operated upon shifting of the transmission 14 from the second-speed position to the third-speed position, and functions as a pressure regulating valve for regulating the releasing pressure in the brake B3 according to the output pressure $P_{SLU}$ of the linear solenoid valve SLU. Described more specifically, the 2–3 timing valve 96 has: an input port 124 to which is applied the FORWARD pressure $P_D$ through the 3–4 shift valve 118 and a solenoid relay valve 122 when the FORWARD pressure $P_D$ is generated by the 2–3 shift valve 90 when the transmission 14 is commanded to be shifted from the second-speed position to the third-speed position; a drain port 126; a spool 128 for connecting the line L04 selectively to the input port 124 or drain port 126 to regulate the pressure $P_{B3}$ in the brake B3 during releasing of the brake B3; a spring 130 for biasing the spool 128; a first plunger 132 which is disposed concentrically with the spool 128 on one side of the spring 130 remote from the spool 128 and which has the same diameter as the spool 128; a second plunger 134 which is disposed concentrically with the spool 128 and abuttable on one end of the spool 128 remote from the spring 130 and which has a larger diameter than the spool 128; a pressure chamber 136 which accommodates the spring 130 and receives the FORWARD pressure $P_D$ through a line L08 when the FORWARD pressure $P_D$ is generated by the 2–3 shift valve 90 upon operation thereof to a position corresponding to the second-speed position of the transmission 14; a pressure chamber 138 which is partially defined by an end face of the first plunger 132 and which receives the output pressure $P_{SLU}$ of the linear solenoid valve SLU; a pressure chamber 140 which is partially defined by an end face of the second plunger 134 and which receives the pressure $P_{B2}$ in the brake B2; and a pressure chamber 142 which receives a feedback pressure.

When the transmission 14 is commanded to be shifted from the second-speed position to the third-speed position, the pressure $P_{B3}$ in the brake B3 in the process of a releasing action is regulated by the 2–3 timing valve 98, such that the pressure $P_{B3}$ decreases with an increase in the engaging pressure $P_{B2}$ in the brake B2 and increases with an increase in the output pressure $P_{SLU}$ of the linear solenoid valve SLU, according to the following equation (2):

$$P_{B3}=P_{SLU} \cdot S_3(S_3-S_4)-P_{B2} \cdot S_5/(S_3-S_4) \qquad (2)$$

where, $S_3$: cross sectional area of the spool 128 (first plunger 132)

$S_4$: cross sectional area of a land of the spool 128 on the side of the second plunger 134

$S_5$: cross sectional area of the second plunger 134

The spool 128 of the 2–3 timing valve 98 is locked when the pressure chamber 136 receives the FORWARD pressure $P_D$ generated from the 2–3 shift valve 90 upon operation thereof to its position corresponding to the second-speed position of the transmission 14. This arrangement prevents a change in the volume of the pressure chamber 138 of the 2–3 timing valve 98 to thereby avoid an influence of that volume change on the pressure regulating operation of the B3 control valve 92 during the shifting of the transmission 14 from the first-speed position to the second-speed position, even though the pressure chamber 138 of the 2–3 timing valve 98 communicates with the pressure chamber 112 of the B3 control valve 92.

The hydraulic control circuit 84 further includes a C0 exhaust valve 150 including a spool 152 which is moved to its closed position according to the output pressure $P_{S3}$ of the third solenoid-operated valve S3 and the pressure in the line L01. The spool 152 is moved to its open position according to the output pressure $P_{S4}$ of the fourth solenoid-operated valve S4. In the open position, the LINE pressure $P_L$ received from a 4–5 shift valve (not shown) is applied to the clutch C0 and a C0 accumulator 154 when the transmission 14 is placed in any position other than the second-speed or fifth-speed position.

Figure 7:
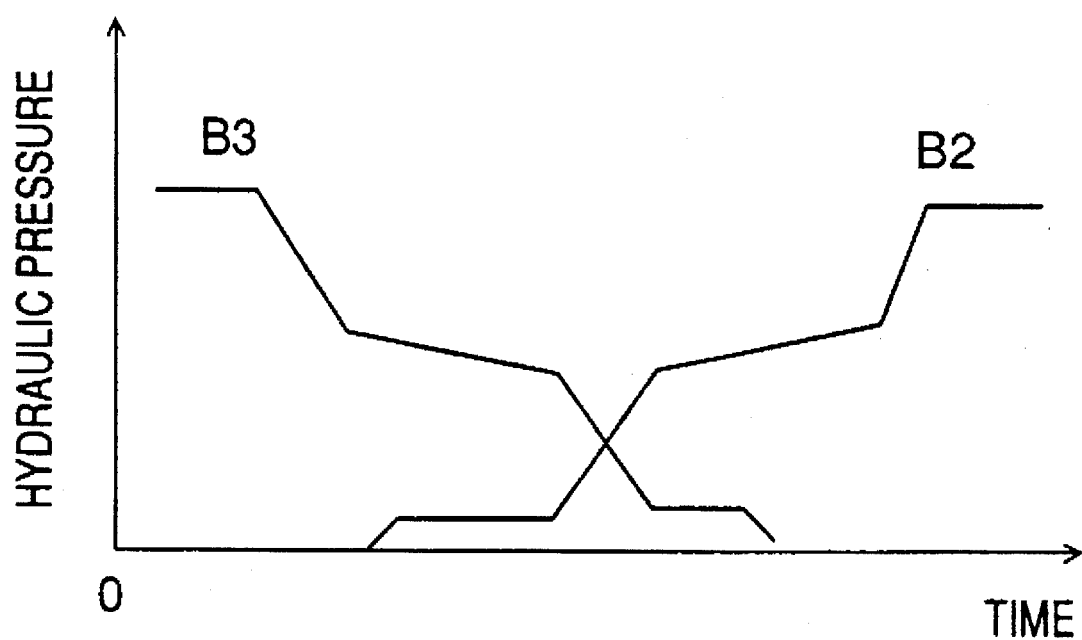
FIG. 7 is a time chart indicating changes in releasing and engaging hydraulic pressures in the two frictional coupling devices which are actuated by the hydraulic control system of FIGS. 5 and 6 to effect a clutch-to-clutch shift of the transmission.

In the shift control apparatus constructed as described above, the automatic transmission 14 is commanded to be shifted up from the second-speed position to the third-speed position when the transmission controller 78 determines that this shift-up action ("clutch-to-clutch shift") of the transmission 14 should be effected. In this case, the 2–3 shift valve 90 is operated from its position corresponding to the second-speed position of the transmission 14 to its position corresponding to the third-speed position. As a result, the FORWARD pressure $P_D$ is applied to the brake B2 through the 2–3 shift valve 90 and line L03. At the same time, the FORWARD pressure $P_D$ generated from the 2–3 shift valve 90 is applied to the pressure chamber 110 of the B3 control valve 92 to lock the spool 104 in its open position, while the lines L01 and L04 are connected to each other by the 2–3 shift valve 90, and the fluid in the pressure chamber 136 of the 2–3 timing valve 98 is discharged through the line L08 and the 2–3 shift vale 90. Thus, the brake B3 is released with its releasing pressure being regulated by the 2–3 timing valve 98 according to the pressure $P_{SLU}$. FIG. 7 shows an example of changes in the pressures $P_{B2}$ and $P_{B3}$ of the brakes B2 and B3 during the clutch-to-clutch shift of the automatic transmission 14 from the second-speed position "2nd" to the third-speed position "3rd".

Figure 8:
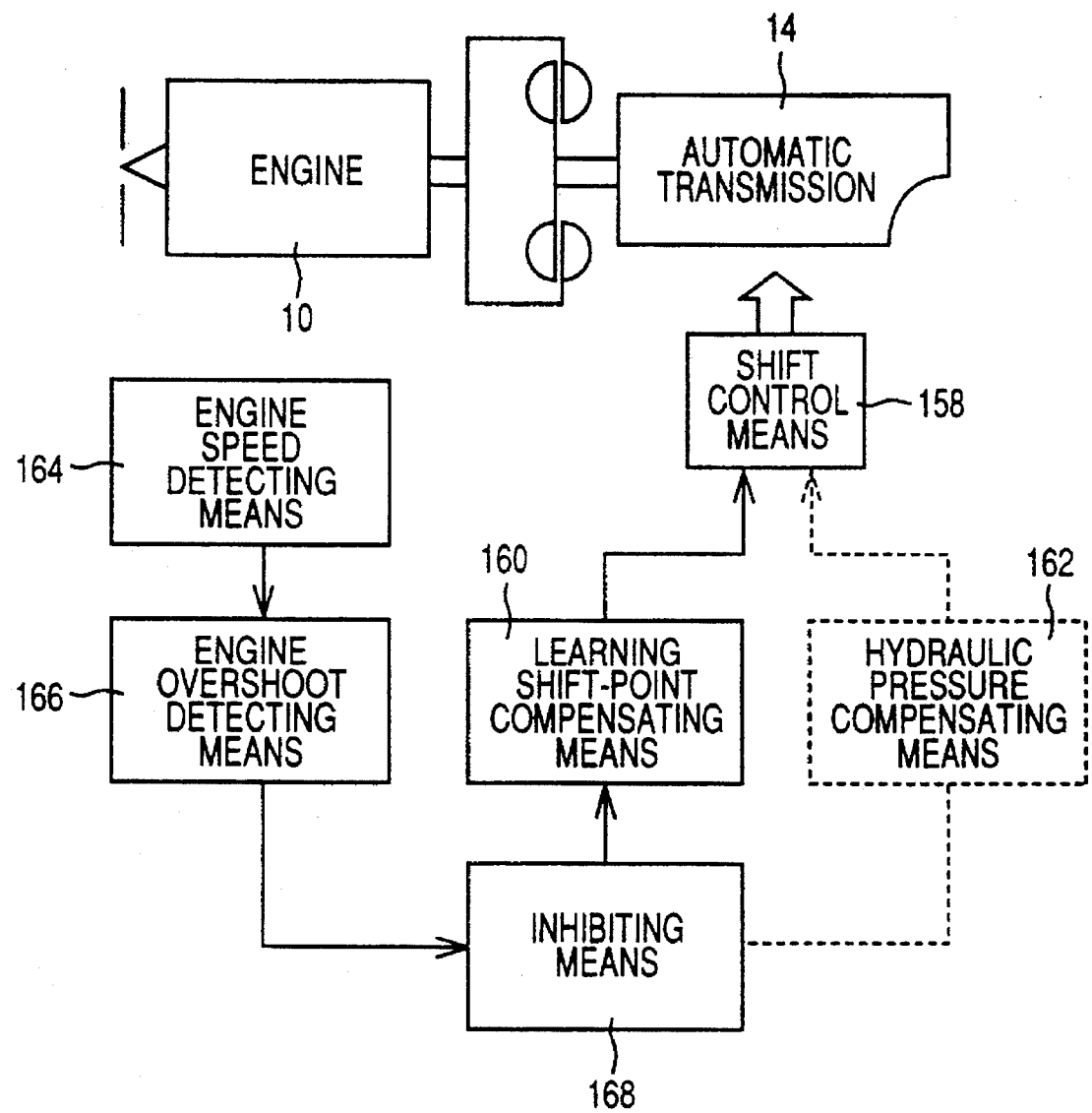
FIG. 8 is a block diagram indicating various functional means of an electronic transmission controller of the electronic control system of FIG. 3.

Referring next to the block diagram of FIG. 8, there will be described various functional means of the electronic transmission controller 78 of the shift control apparatus constructed according to one embodiment of the present invention.

The transmission controller 78 includes shift control means 158 for placing the automatic transmission 14 in a suitable one of its operating positions or gear positions, on the basis of the detected opening angle $\theta_{TH}$ of the first throttle valve 52 and the detected speed V of the vehicle, and according to predetermined shift patterns or shift boundary lines stored in the ROM of the transmission controller 78. The shift boundary lines correspond to the respective operating positions of the transmission 14, and one of the shift boundary lines which corresponds to the currently selected or established position of the transmission 14 is used to determine whether the transmission 14 is shifted from the current position to another position. For each operating position of the transmission 14, there are provided a shift-down boundary line, and a shift-up boundary line as indicated in FIG. 9. Each shift boundary line is a relationship between the throttle valve opening angle $\theta_{TH}$ and the vehicle speed V. The shift control means 158 controls the solenoid-operated valves S1, S2 and S3 to shift the transmission 14 to the determined new position.

Figure 10:
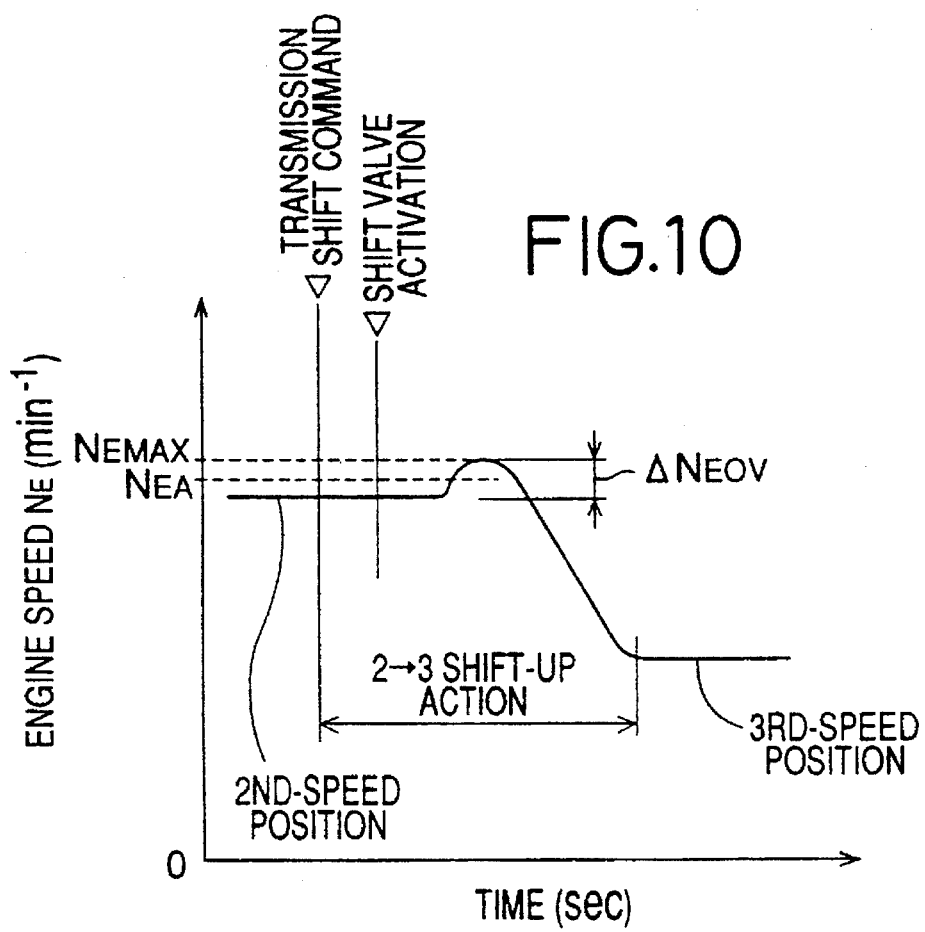
FIG. 10 is a view for explaining an amount of engine speed overshoot detected by engine overshoot detecting means shown in FIG. 8, and a change in the engine speed during a clutch-to-clutch shift of the transmission.

The transmission controller 78 further includes learning shift-point compensating means 160 for changing or compensating the shift boundary lines used for determining whether the transmission 14 should be shifted, during a high-load running of the vehicle with the throttle opening angle θ of the first throttle valve 52 being 80% or larger, for example, so that the engine speed $N_E$ during a shift-up action of the transmission 14 will not rise above a predetermined upper limit. For instance, the learning shift-point compensating means 160 is adapted to effect learning compensation of the shift-up boundary lines used for shift-up actions of the transmission 14 from the first-speed position "1st" to the second-speed position "2nd", from the second-speed position to the third-speed position "3rd" (hereinafter referred to as "2→3 clutch-to-clutch shift-up action"), and from the third-speed position to the fourth-speed position "4th". Broken line in FIG. 9 shows an example of a change in the boundary speed V of the vehicle for the 2→4 clutch-to-clutch shift-up action of the transmission 14, when the throttle opening angle θ is 80% or larger, for example. The learning shift-point compensating means 160 is usually arranged to be operated during a high-load running of the vehicle with the throttle valve opening θ being larger than an upper limit, for example, 80%. As indicated by the broken line in FIG. 9, the shift-up boundary speed of the vehicle according to the shift-up boundary line is lowered so that the highest engine speed $N_{EMAX}$ during the shift-up action of the transmission 14 during the high-load running of the vehicle coincides with a predetermined value $N_{EA}$ as indicated in FIG. 10. The thus compensated shift-up boundary line is stored in a memory and is subsequently used to determine whether the appropriate shift-up action of the transmission should take place.

The transmission controller 78 may preferably or optionally include hydraulic pressure compensating means 162 which is adapted to compensate or adjust the hydraulic pressure in one of the frictional coupling devices (brakes B2 and B3) associated with the 2→3 clutch-to-clutch shift-up action of the automatic transmission 14, so as to permit smooth 2→3 clutch-to-clutch shift-up action. For example, the releasing pressure $P_{B3}$ of the brake B3 or the engaging pressure $P_{B2}$ of the brake B2 is adjusted by learning compensation so that the amount of overshoot $\Delta N_{EOV}$ of the engine speed $N_E$ during the 2→3 clutch-to-clutch shift-up action of the transmission 14 is held within a predetermined permissible or optimum range, or so that the amount of tie-up of the brakes B2, B3 (which may cause a temporary drop of the output torque of the transmission 14) is held within a predetermined permissible range. Described more specifically, if the amount of engine overshoot $\Delta N_{EOV}$ or amount of tie-up of the brakes B2, B3 is found to be outside the predetermined permissible range, the hydraulic pressure compensating means 162 determines a compensation value of the above-indicated releasing or engaging pressure $P_{B3}$, $P_{B2}$ so as to reduce the amount of engine overshoot $\Delta N_{EOV}$ or amount of tie-up of the brakes B2, B3, and the determined compensation value is stored for compensation of the hydraulic pressure upon next occurrence of the 2→3 clutch-to-clutch shift-up action of the transmission 14.

The transmission controller 78 also includes engine speed detecting means 164 constituted by the engine speed sensor 58 for detecting the engine speed $N_E$, and engine overshoot detecting means 164 for detecting the amount of overshoot $\Delta N_{EOV}$ of the engine speed $N_E$ during the 2→3 clutch-to-clutch shift-up action of the transmission 14, on the basis of the output of the engine speed detecting means 164. Solid line in FIG. 10 indicates a change in the engine speed $N_E$ during a time period from the moment at which the transmission 14 is commanded to effect the 2→3 shift-up action, to the moment when the third-speed position "3rd" has been established upon completion of the 2→3 shift-up action. The amount of engine overshoot $\Delta N_{EOV}$ is an amount of rise of the engine speed $N_E$ from the level when the transmission 14 is still placed in the second-speed position "2nd", to the peak or highest value $N_{EMAX}$ during the 2→3 shift-up action. This engine overshoot $\Delta N_{EOV}$ occurs immediately before the engine speed $N_E$ has begun to be lowered due to a progress of the 2→3 shift-up action of the transmission 14.

The transmission controller 78 further includes inhibiting means 168 for determining whether the amount of engine overshoot $\Delta N_{EOV}$ detected by the engine overshoot detecting means 166 has reached or exceeded a predetermined threshold value A, and inhibits or terminates an operation of the learning shift-point compensating means 160 if the detected amount of engine overshoot $\Delta N_{EOV}$ has reached or exceeded the predetermined threshold value A. If the amount of engine overshoot $\Delta N_{EOV}$ has not reached the threshold valve A, the inhibiting means 168 permits the operation of the learning shift-point compensating means 160. If the hydraulic pressure compensating means 162 is provided, the inhibiting means 168 inhibits or terminates the operation of the learning shift-point compensating means 160 while at the same time permits the operation of the hydraulic pressure compensating means 162, if the amount of engine overshoot $\Delta N_{EOV}$ has reached or exceeded the threshold value A. In this case, the threshold value A is determined to determine whether the amount of engine overshoot $\Delta N_{EOV}$ is so large that the hydraulic pressure compensating means 162 should be operated to restrict the engine overshoot.

Figure 11:
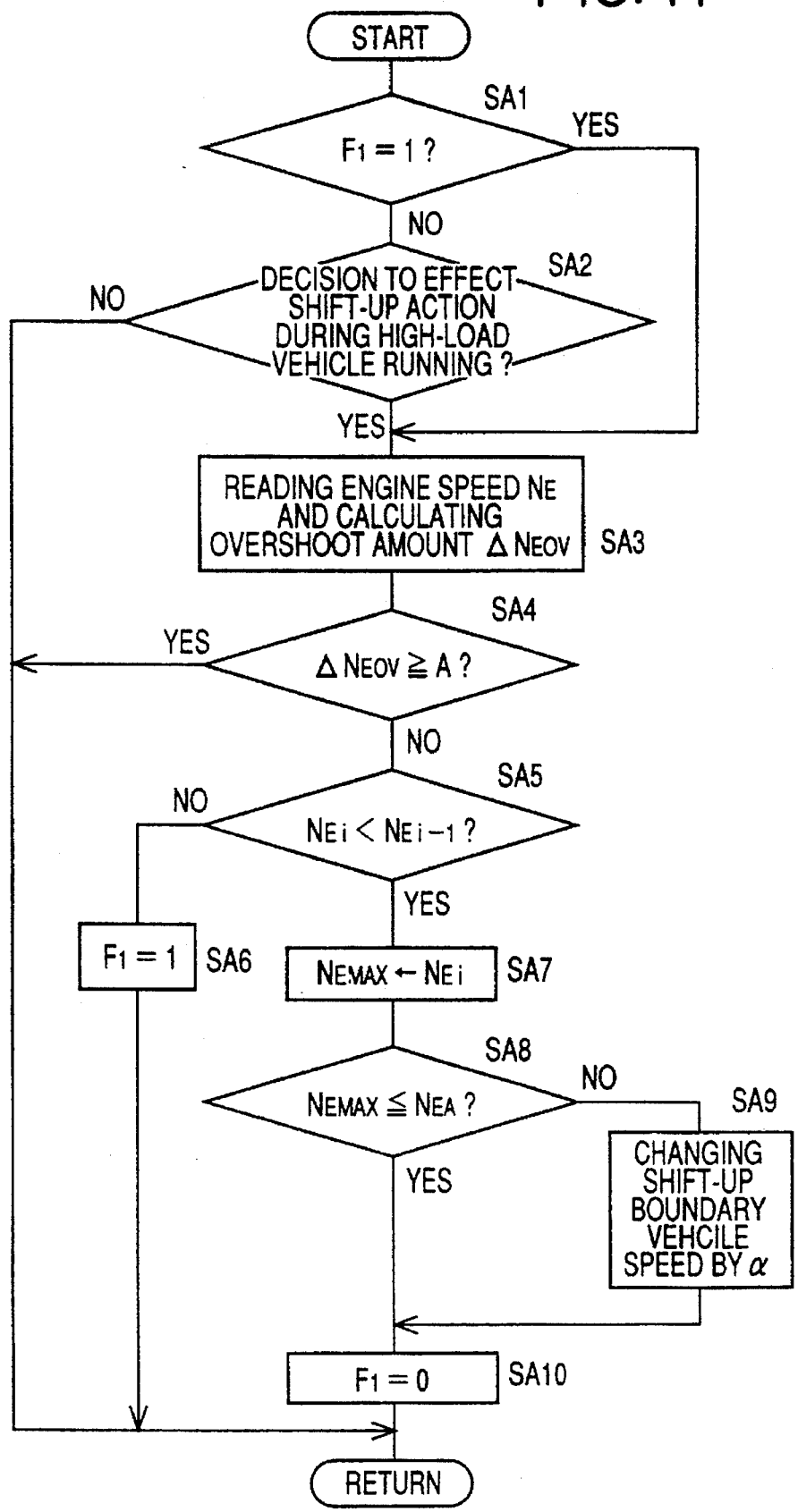
FIG. 11 is a flow chart illustrating a part of an operation of the transmission controller of FIG. 3.

Referring to the flow chart of FIG. 11, there is illustrated a control routine executed by the transmission controller 78 to prevent an excessive rise of the engine speed $N_E$ above the predetermined upper limit during a shift-up action of the transmission 14. This control routine is initiated with step SA1 to determine whether a flag F1 is set at "1". As is apparent from the following description of the routine, the flag F1 is set to "1" in step SA6 when the engine speed $N_E$ has begun to drop, namely, when the engine speed $N_E$ has reached the highest or peak value $N_{EMAX}$ during the shift-up action of the transmission 14 in the positive drive mode.

Since the flag F1 is initially set at "0", a negative decision (NO) is obtained in step SA1, and the control flow goes to step SA2 to determine whether a decision to effect a clutch-to-clutch shift-up action (e.g., 2→3 shift-up action) of the transmission 14 has been made during a high-load running of the vehicle with the throttle opening angle θ being higher than the upper limit (e.g., 80%). This determination is made on the basis of the detected opening angle θ of the first throttle valve 52 and a shift command generated from the shift control means 158. If a negative decision (NO) is obtained in step SA2, one cycle of execution of the routine of FIG. 11 is terminated. If an affirmative decision (YES) is obtained in step SA2, the control flow goes to step SA3 corresponding to the engine overshoot detecting means 166, to calculate the amount of overshoot $\Delta N_{EOV}$ of the engine speed $N_E$, which is equal to ($N_E - N_{OUT} \times i_2$), where $N_{OUT}$ represents the speed of the output shaft 42 of the transmission 14, and $i_2$ represents the gear ratio of the transmission 14 placed in the second-speed position "2nd".

Figure 12:
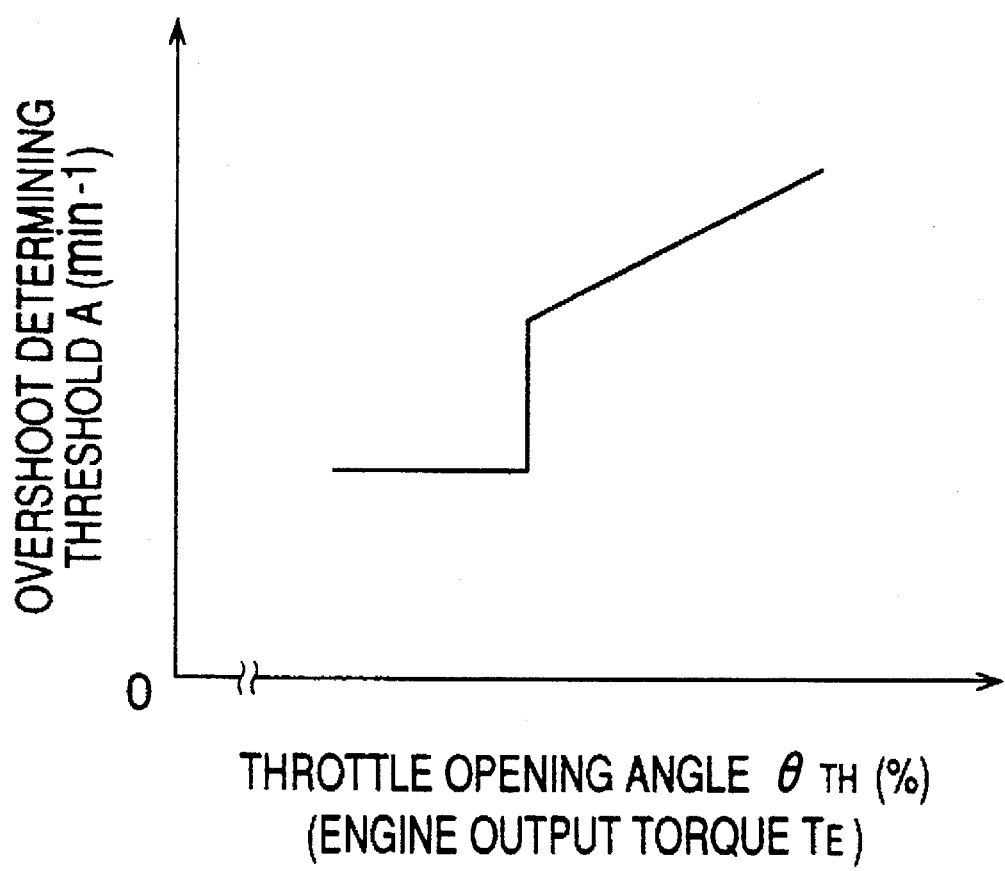
FIG. 12 is a graph indicating a relationship used for determining a threshold A in the control routine of FIG. 11.

Step SA3 is followed by step SA4 corresponding to the inhibiting means 168, to determine whether the engine overshoot amount $\Delta N_{EOV}$ is equal to or larger than the predetermined threshold value A explained above. This threshold value A is determined to determine whether the engine overshoot amount $\Delta N_{EOV}$ is so large that the hydraulic pressure compensating means 162 should be operated to restrict the engine overshoot amount $\Delta N_{EOV}$. For example, the threshold value A is determined on the basis of the detected throttle opening angle θ and according to a predetermined relationship between the throttle opening angle θ and the threshold value A, as indicated in FIG. 12. This relationship is stored in the ROM of the transmission controller 78. During a clutch-to-clutch shift-up action such as the 2→3 clutch-to-clutch shift-up action of the transmission 14, the engine overshoot amount $\Delta N_{EOV}$ generally eventually increases up to the threshold value A, resulting in an affirmative decision (YES) in step SA4, and one cycle of execution of the routine is terminated. Thus, step SA9 corresponding to the learning shift-point compensating means 160 is not implemented, but the hydraulic pressure compensating means 162 if provided is operated to compensate the releasing pressure $P_{B3}$ or engaging pressure $P_{B2}$ so as to reduce the engine overshoot amount $\Delta N_{EOV}$ to within the predetermined permissible range.

Before the engine overshoot amount $\Delta N_{EOV}$ has increased to the threshold value A, a negative decision (NO) is obtained in step SA4, and the control flow goes to step SA5 to determine whether the engine speed $N_E$ has reached the highest speed $N_{EMAX}$ during the clutch-to-clutch shift-up action. This determination is made by determining whether the engine speed $N_{Ei}$ detected in the present cycle of execution of the routine is lower than the engine speed $N_{Ei-1}$ detected in the last cycle of execution of the routine. If an affirmative decision (YES) is obtained in step SA5 for the first time, it means that the engine speed $N_E$ has reached the highest speed $N_{EMAX}$.

If a negative decision (NO) is obtained in step SA5, the flag F1 is set to "1" to indicate that the engine speed $N_E$ has not increased to the highest speed $N_{EMAX}$. In this case, one cycle of execution of the routine is terminated. If the engine speed $N_E$ has reached the highest or peak value $N_{EMAX}$ during repeated execution of the routine after the decision to effect the clutch-to-clutch shift-up action of the transmission 14, an affirmative decision (YES) is obtained in step SA5, and the control flow goes to step SA7 to set the presently detected engine speed $N_{Ei}$ as the highest speed $N_{EMAX}$, and then goes to step SA8 to determine whether the highest speed $N_{EMAX}$ or present engine speed $N_{Ei}$ has is equal to or lower than a predetermined reference value $N_{EA}$. This reference value $N_{EA}$ is changed as a function of the throttle opening angle θ or the operating position of the transmission 14 prior to the shift-up operation.

If an affirmative decision (YES) is obtained in step SA8 (if the highest or peak engine speed $N_{EMAX}$ is not higher than the reference value $N_{EA}$, it means that it is not necessary to activate the learning shift-point compensating means 160 to change the stored shift-up boundary line. If a negative decision (NO) is obtained in step SA5, the control flow goes to step SA9 to change the currently stored shift-up boundary line, more precisely, change the shift-up boundary vehicle speed by an amount α suitable for reducing the highest speed $N_{EMAX}$ to the reference value $N_{EA}$ when the same shift-up action subsequently takes place according to the changed shift-up boundary line. The thus changed shift-up boundary line is subsequently used to determine whether the same shift-up action of the transmission 14 should take place. As mentioned above, the broken line in FIG. 9 indicates a decrease of the shift-up boundary vehicle speed V for the 2→3 clutch-to-clutch shift-up action of the transmission 14 when the throttle opening angle θ is larger than 80%, for example. Steps SA7–SA9 correspond to the learning shift-point compensating means 160.

In the present embodiment, the inhibiting means 168 determines in step SA4 whether the amount of overshoot $\Delta N_{EOV}$ of the engine speed $N_E$ has reached or exceeded the predetermined threshold value A. If the overshoot amount $\Delta N_{EOV}$ has reached or exceeded the threshold value A, the inhibiting means 168 inhibits the operation of the learning shift-point compensating means 160, that is, skips steps SA7–SA9 corresponding to the compensating means 160. This arrangement prevents an undesirable operation of the learning shift-point compensating means 160 when the engine overshoot amount $\Delta N_{EOV}$ is comparatively large due to an excessive amount of rise of the engine speed $N_E$ during the period of shift response time of the automatic transmission 14, which excessive amount of rise may arise from an excessively high rate of decrease in the releasing pressure $P_{B3}$ of the brake B3 during the 2→3 clutch-to-clutch shift-up action of the transmission 14 or an influence of the control system for the brake B3. In other words, the learning shift-point compensating means 160 is operated only when the engine overshoot amount $\Delta N_{EOV}$ during the shift-up action of the transmission 14 is smaller than the threshold value A. Therefore, the learning compensation of the shift-up boundary line by the learning shift-point compensating means 160 can be achieved with high stability without an adverse influence of the comparatively large engine overshoot $\Delta N_{EOV}$ during the clutch-to-clutch shift-up action of the transmission 14.

Since the operation of the learning shift-point compensating means 160 is inhibited if the engine overshoot amount $\Delta N_{EOV}$ during the shift-up action of the transmission 14 is equal to or larger than the threshold value A as described above, the learning compensation of the shift-up boundary line by the compensating means 160 is not adversely influenced by a change of the engine speed $N_E$ by the hydraulic pressure compensating means 162 which is optionally provided to compensate the releasing pressure $P_{B3}$ of the brake B3 during the clutch-to-clutch shift-action of the transmission 14 so that the amount of engine overshoot or the amount of tie-up of the brakes B2, B3 is reduced to within the predetermined permissible or optimum range.

There will be described other embodiments of this invention by reference to FIGS. 13–19. In these figures, the same reference numerals or signs as used in the first embodiment will be used to identify the same elements, and redundant description of these elements will not be provided.

Figure 13:
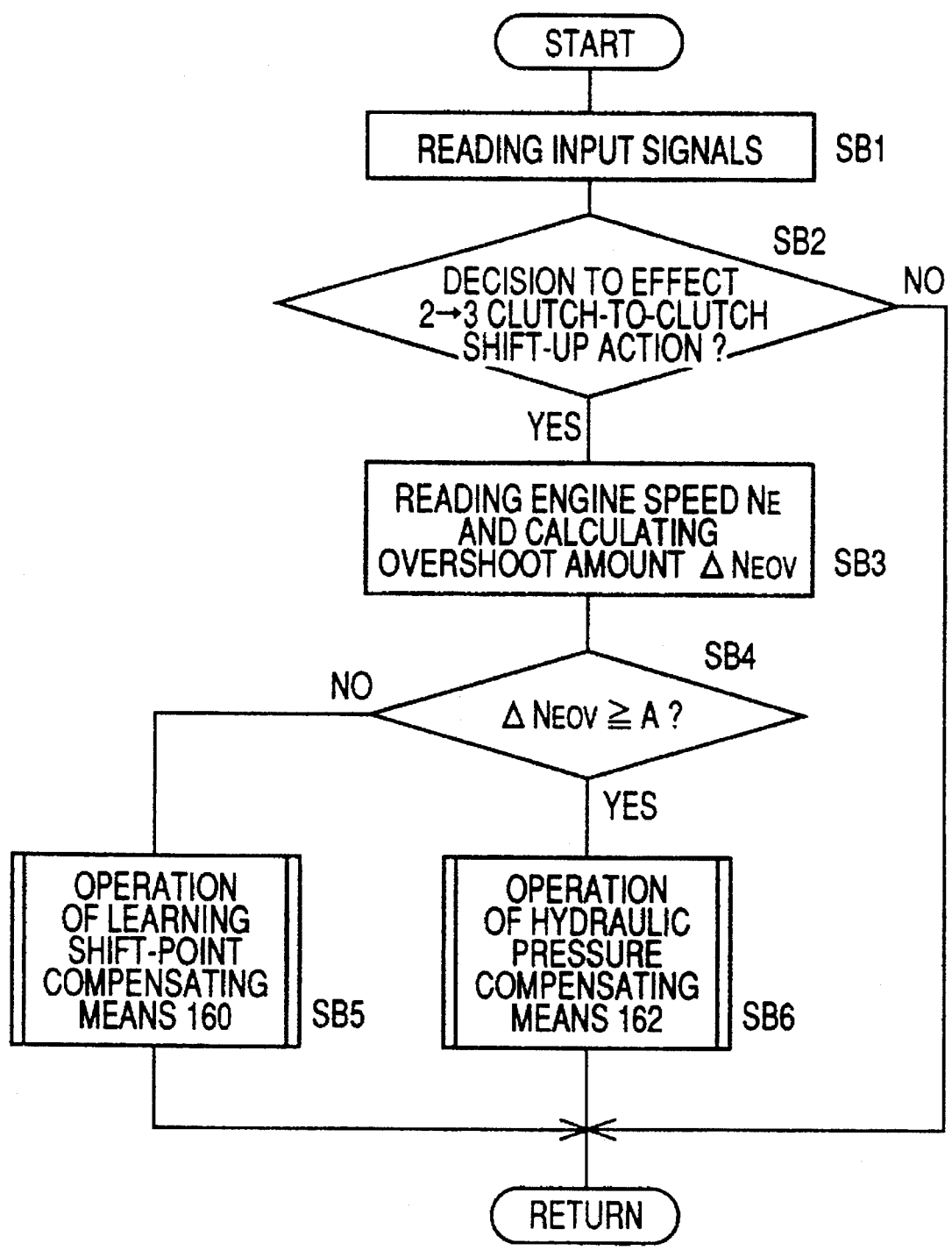
FIG. 13 is a flow chart illustrating a part of an operation of an electronic transmission controller in another embodiment of the invention.
Figure 14:
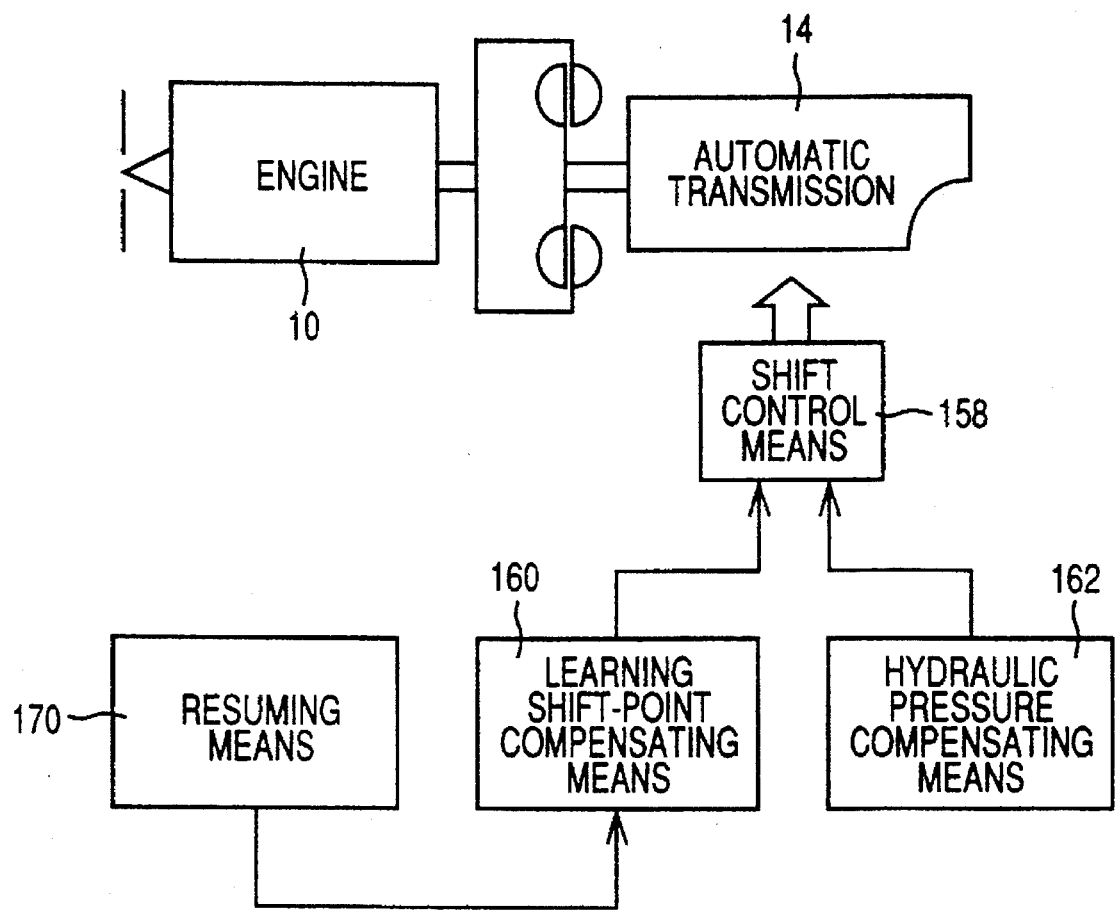
FIG. 14 is a block diagram indicating various functional means of the electronic transmission controller in the embodiment of FIG. 13.

Referring to the flow chart of FIG. 13, there is illustrated a control routine executed by the transmission controller 78 where the shift control apparatus is provided with the hydraulic pressure compensating means 162. This control routine is also adapted such that the inhibiting means 168 is activated to inhibit the operation of the learning shift-point compensating means 160 and permit the operation of the hydraulic pressure compensating means 162, if the amount of engine overshoot during the 2→3 clutch-to-clutch shift-up action of the transmission 14 has exceeded a predetermined upper limit.

The control routine of FIG. 13 is initiated with step SB1 to read and process the input signals. Step SB2 is then implemented to determine whether a decision to effect the 2→3 clutch-to-clutch shift-up action of the transmission 14 has been made. If an affirmative decision (YES) is obtained in step SB2, the control flow goes to step SB3 corresponding to the engine overshoot detecting means 166, to calculate the amount of overshoot $\Delta N_{EOV}$ of the engine speed $N_E$ in the same manner as described above with respect to step SA3.

Step SB3 is followed by step SB4 corresponding to the inhibiting means 168, to determine whether the calculated amount of engine overshoot $\Delta N_{EOV}$ is equal to or larger than the threshold value A. As explained above with respect to step SA4, the threshold value A is determined to determine whether the amount of engine overshoot $\Delta N_{EOV}$ is so large that the hydraulic pressure compensating means 162 should be operated to reduce the engine overshoot amount. If a negative decision (NO) is obtained in step SB4, the control flow goes to step SB5 in which the learning shift-point compensating means 160 is operated to effect the learning compensation of the 2→3 shift-up boundary line as in steps SA7–SA9 in the first embodiment of FIG. 11. If an affirmative decision (YES) is obtained in step SB4, the control flow goes to step SB6 in which the hydraulic pressure compensating means 162 is operated to determine a compensation value for compensating the releasing pressure $P_{B3}$ of the brake B3 so that the amount of engine overshoot $\Delta N_{EOV}$ or the amount of tie-up of the brakes B2, B3 is reduced to within the predetermined permissible range. The determined compensation value is stored in a memory, and is subsequently used for compensating the releasing pressure $P_{B3}$ in the next 2→3 clutch-to-clutch shift-up action of the transmission 14.

In the present second embodiment, the inhibiting means 168 determines in step SB4 whether the amount of engine overshoot $\Delta N_{EOV}$ is equal to or larger than the threshold value A, and inhibits the operation of the learning shift-point compensating means 160 in step SB5 if the amount of engine overshoot $\Delta N_{EOV}$ is equal to or larger than the threshold value A. Thus, the present second embodiment provides the same advantage as the first embodiment. Further, the inhibiting means 168 activates the hydraulic pressure compensating means 162 in step SB6 to determine the compensation value if the operation of the learning shift-point compensating means 160 is inhibited. The determined compensation value is used for compensation or adjustment of the releasing pressure $P_{B3}$ in the next 2→3 shift-up action of the transmission 14, so as to reduce the amount of engine overshoot or the amount of tie-up of the brakes B2, B3 during the subsequent 2→3 shift-up action, so that the learning shift-point compensating means 160 may be subsequently operated. In other words, the amount of engine overshoot $\Delta N_{EOV}$ is subsequently reduced to the threshold value A, resulting in the affirmative decision (YES) in step SB4, owing to the effect of the compensation of the releasing pressure $P_{B3}$ by the hydraulic pressure compensating means 162 in the next or subsequent 2→3 shift-up actions. Thus, step SB4 corresponds to resuming means for determining whether the operation of the hydraulic pressure compensating means 162 has been terminated, and resuming the operation of the learning shift-point compensating means 160 when the operation of the compensating means 162 has been terminated. Step SB4 may also be considered to correspond to compensation coordinating means for controlling the operation of the learning shift-point compensating means 160 depending upon an effect achieved by the learning hydraulic pressure compensating means 162 to reduce the amount of engine overshoot $\Delta N_{EOV}$. The block diagram of FIG. 14 indicates functional means of the transmission controller 78 where step SB4 of the routine of FIG. 13 is interpreted in this manner.

Figure 15:
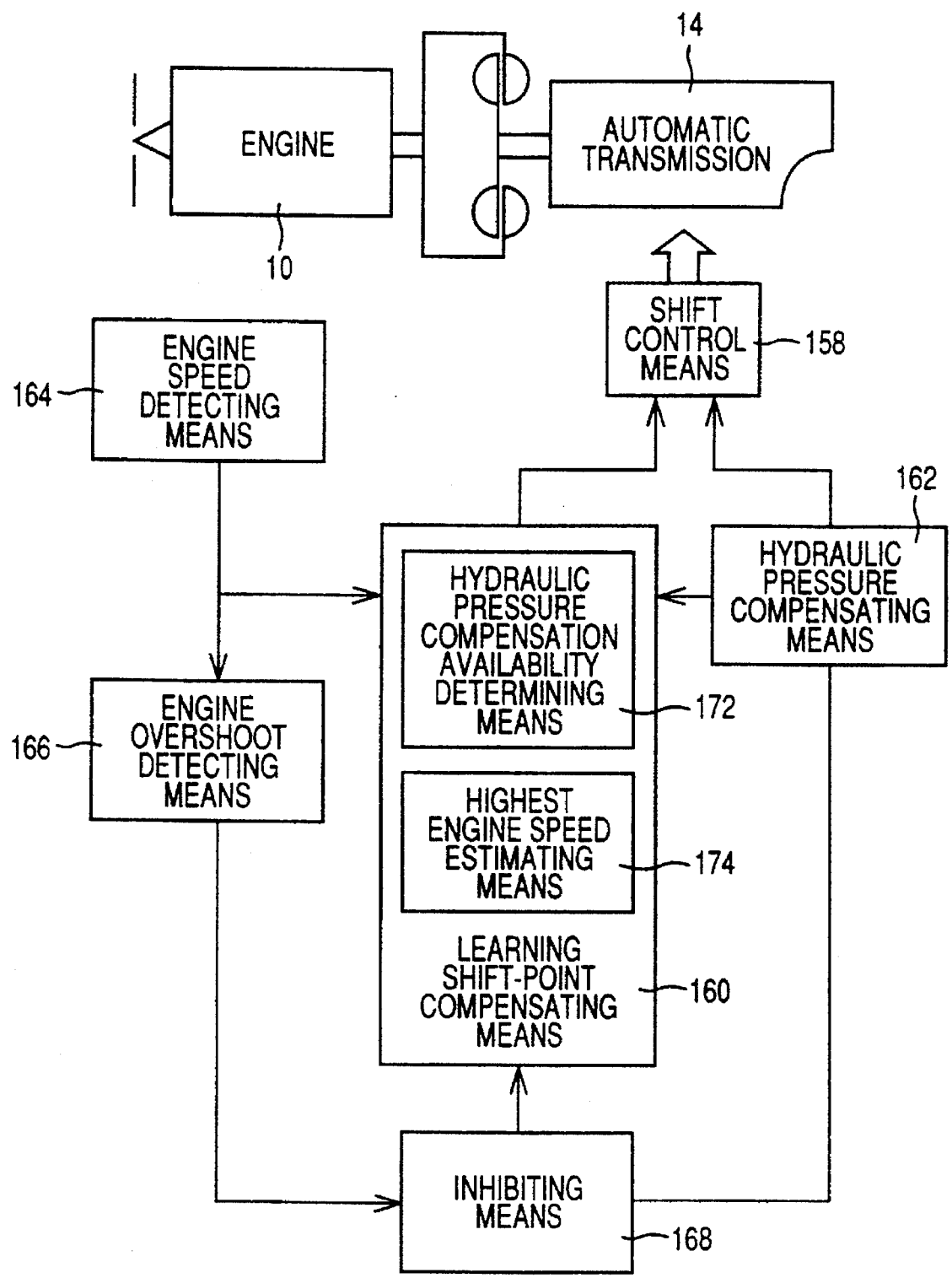
FIG. 15 is a block diagram indicating various functional means of an electronic transmission controller in a further embodiment of the invention.

Referring next to the block diagram of FIG. 15, there are indicated various functional means of the transmission controller 78 used in a further embodiment of this invention. The present third embodiment is different from the first embodiment of FIG. 8 in that the shift control means 160 in the present third embodiment of FIG. 15 consists of determining means 172 and highest engine speed estimating means 174. The determining means 172 is adapted to determine whether the compensation of the hydraulic pressure by the hydraulic pressure compensating means 162 is still available or possible. The highest engine speed determining means 174 is adapted to estimate the highest engine speed $N_{EMAXES}$ which is expected in the next clutch-to-clutch shift-up action of the transmission 14. This estimation is effected on the basis of the compensation value determined by the hydraulic pressure compensation means 162. The determining means 172 determines whether the releasing pressure $P_{B3}$ of the brake B3 or the engaging pressure $P_{B2}$ of the brake B2 can still be changed by the hydraulic pressure compensating means 162. If a negative decision is obtained by the determining means 172, the shift-up boundary line (more specifically, shift-up boundary vehicle speed corresponding to a range of the throttle opening angle θ close to the 100% opening) is changed so that the highest engine speed $N_{EMAX}$ detected in the present control cycle coincides with the predetermined reference value $N_{EA}$. If an affirmative decision is obtained, the determining means 172 changes the shift-up boundary line so that the highest engine speed $N_{EMAXES}$ estimated by the highest engine speed estimating means 174 (estimated speed $N_{EMAX}$ in the next shift-up action) coincides with the reference value $N_{EA}$.

Figure 16:
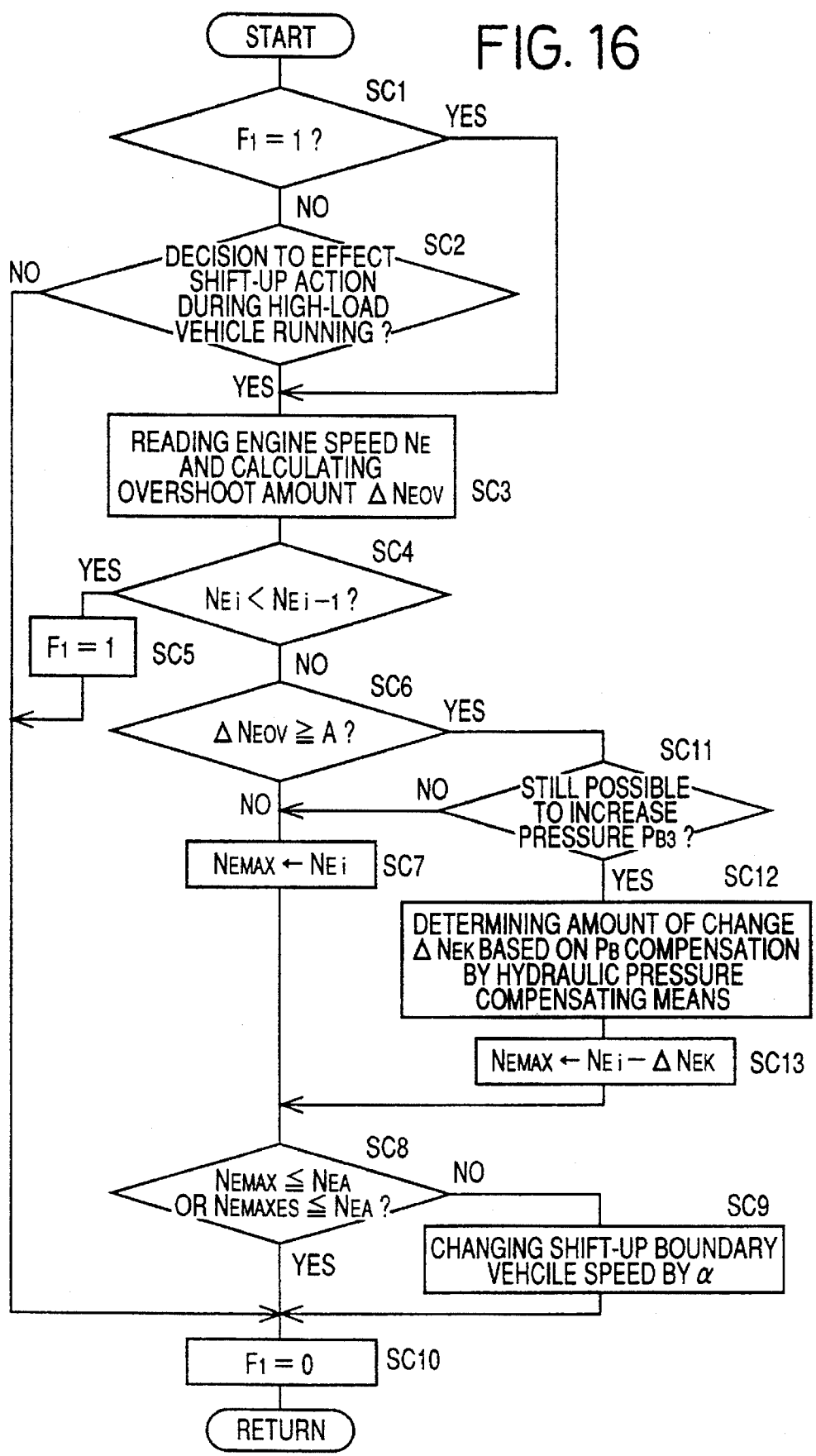
FIG. 16 is a flow chart illustrating a part of an operation of the transmission controller in the embodiment of FIG. 15.

The transmission controller 78 in the present third embodiment is adapted to execute a control routine illustrated in the flow chart of FIG. 16. Steps SC1 through SC10 in the present routine are functionally similar to steps SA1 through SA10 in the routine of FIG. 11, with an exception that the order of implementation of steps SC4, SC5 and SC6 is different from that of steps SA4, SA5 and SA6. Therefore, these steps SC1–SC10 will not be described, and the following description refers to steps SC11, SC12 and SC13 only.

If the amount of engine overshoot $\Delta N_{EOV}$ is determined in step SC6 to be equal to or larger than the threshold value A, the control flow goes to step SC11 corresponding to the determining means 172, to determine whether the compensation of the releasing or drain pressure $P_{B3}$, for example, by the hydraulic pressure compensating means 162 is still possible so as to reduce the engine overshoot amount $\Delta N_{EOV}$ (or amount of tie-up of the brakes B2, B3) to within the predetermined permissible range, namely, whether the releasing pressure $P_{B3}$ can be further increased to reduce the engine overshoot amount by a suitable amount. If a negative decision (NO) is obtained in step SC11, the control flow goes to steps SC7–SC9 to activate the learning shift-point compensating means 160.

If an affirmative decision (YES) is obtained in step SC11, the control flow goes to step SC12 to determine an amount of change $\Delta N_{EK}$ of the highest engine speed $N_{EMAX}$ in the next 2→3 clutch-to-clutch shift-up action of the transmission 14, on the basis of the compensation value of the releasing pressure $P_{B3}$ determined by the hydraulic pressure compensating means 162. This determination is effected according to a stored predetermined relationship between the compensating value and the amount of change $\Delta N_{EK}$. Then, step SC13 is implemented to calculate the estimated highest engine speed $N_{EMAXES}$ by subtracting the determined amount of change $\Delta N_{EK}$ from the presently detected engine speed $N_{Ei}$. In this respect, it is noted that the the presently detected engine speed $N_{Ei}$ is the highest engine speed $N_{EMAX}$, and that the determined amount of change $\Delta N_{EK}$ is the amount of decrease of the highest engine speed $N_{EMAX}$ due to the compensation of the releasing pressure $P_{B3}$ by the hydraulic pressure compensating means 162. It will be understood that steps SC12 and SC13 correspond to the highest engine estimating means 174 for estimating the highest engine speed $N_{EMAXES}$ which is expected to be established in the next clutch-to-clutch shift-up action of the transmission 14.

Step SC13 is followed by steps SC8 and SC9 in which the learning shift-point compensating means 160 is operated to change the shift-up boundary vehicle speed so that the thus estimated highest engine speed $N_{EMAXES}$ coincides with the reference value $N_{EA}$.

In the present third embodiment, steps SC8 and SC9 corresponding to the learning shift-point compensating means 160 are implemented irrespective of whether the amount of engine overshoot $\Delta N_{EOV}$ is larger or smaller than the threshold value A, namely, irrespective of whether the affirmative or negative decision is obtained in step SC6. If the determining means 172 determines in step SC11 that the compensation by the hydraulic pressure compensating means 162 is still possible, the estimating means 174 estimates in steps SC12 and SC13 the highest engine speed $N_{EMAXES}$ in the next clutch-to-clutch shift-up action of the transmission 14, and the learning shift-point compensating means 160 is operated in steps SC8 and SC9 to change the shift-up boundary vehicle speed so that the estimated highest engine speed $N_{EMAXES}$ coincides with the reference value $N_{EA}$. Accordingly, the compensating means 160 will not change the shift-up boundary vehicle speed so as to avoid an excessive decrease of the highest engine speed $N_{EMAX}$ in the next clutch-to-clutch shift-up action, whereby the learning compensation of the shift-up boundary line by the compensating means 160 is further stabilized. It will be further understood that the determining means 172 and the highest engine speed estimating means 174 may be considered to function as compensation coordinating means for controlling the learning shift-point compensating means 160 depending upon the compensation value of the releasing pressure $P_{B3}$ determined by the hydraulic pressure compensating means 162, that is, depending upon the expected effect of reducing the engine overshoot amount $\Delta N_{EOV}$ by the learning compensation of the pressure $P_{B3}$ by the compensating means 162.

Figure 17:
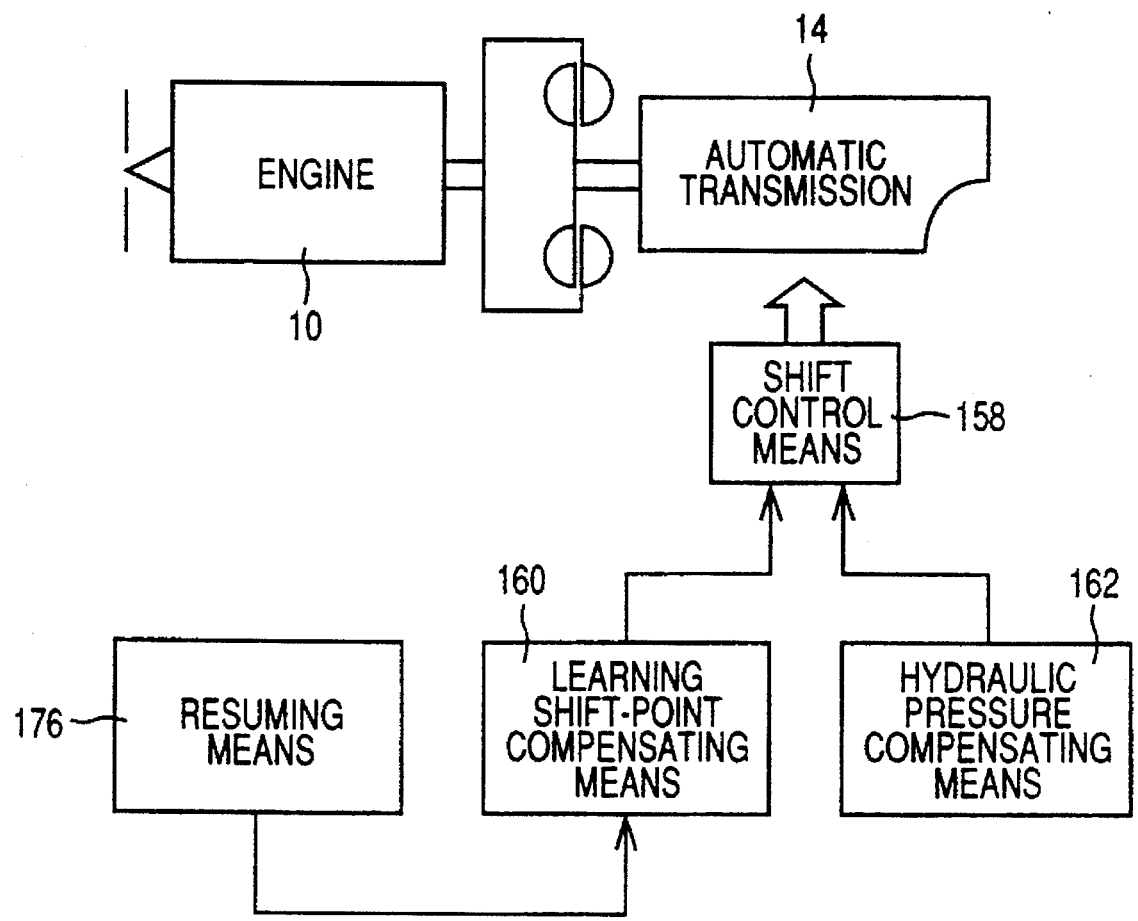
FIG. 17 is a block diagram indicating various functional means of an electronic transmission controller used in a still further embodiment of the invention.

The block diagram of FIG. 17 shows functional means of the transmission controller 78 used in a fourth embodiment of this invention. In the present embodiment, the transmission controller 78 includes resuming means 176 for resuming the operation of the hydraulic pressure compensating means 162 which has been held off. The resuming means is adapted to determine whether the operation of the learning shift-point compensating means 160 has been terminated. This determination may be effected by determining whether the amount of change of the shift-up boundary line by the compensating means 160 is zero. If an affirmative determination is obtained, this resuming means 176 resumes the operation of the hydraulic pressure compensating means 162.

Figure 18:
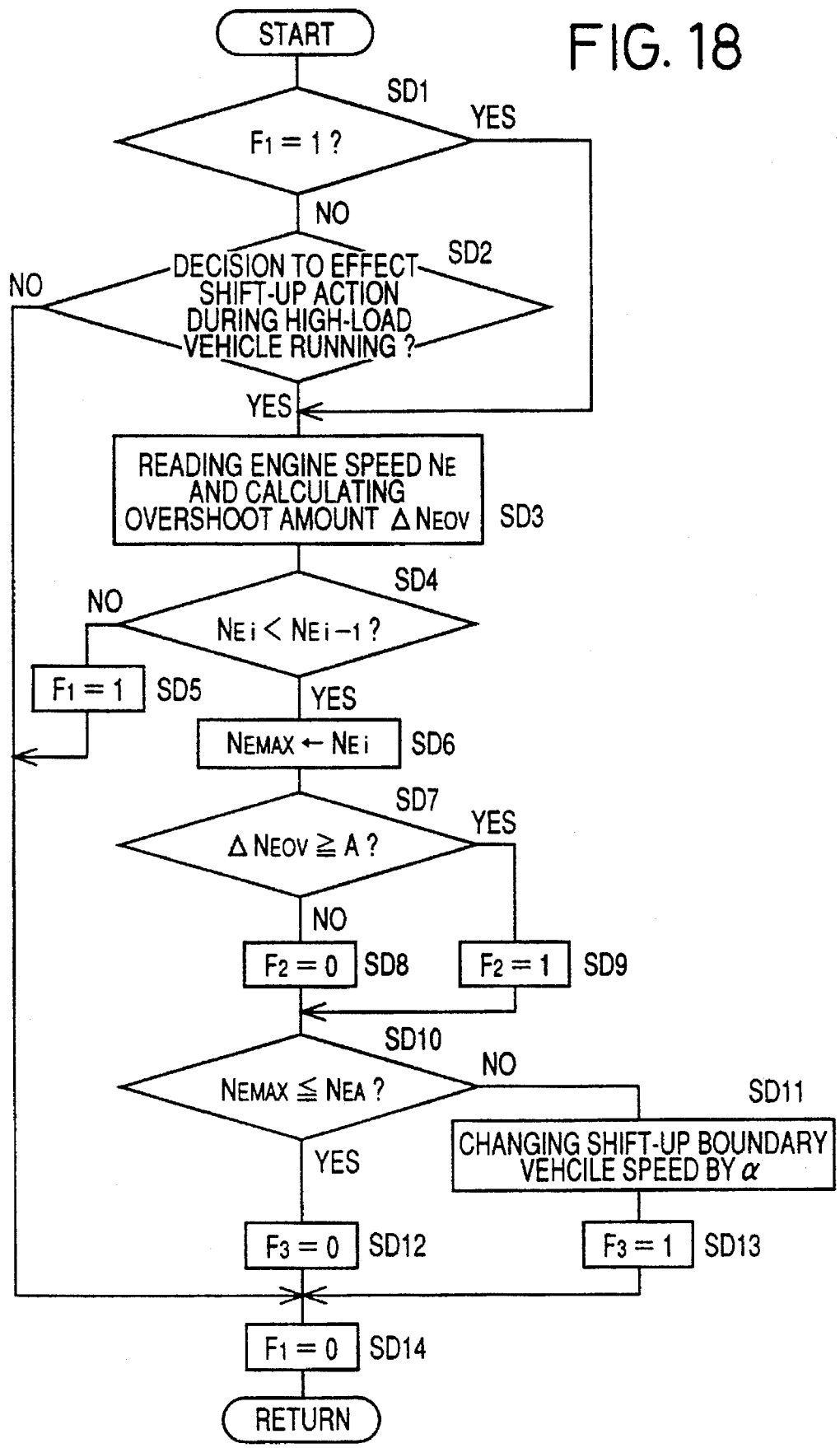
FIG. 18 is a flow chart illustrating a part of an operation of the transmission controller in the embodiment of FIG. 17.

Referring to the flow charts of FIGS. 18 and 19, there are illustrated control routines executed by the transmission controller 78 in the fourth embodiment. Steps SD1 through SD7 in the routine of FIG. 18 are functionally similar to steps SA1 through SA7 in the routine of FIG. 11 or SC1 through SC7 in the routine of FIG. 16, with an exception that the order of implementation of steps SD4–SD7 or steps SD6 and SD7 are different from that of steps SA4–SA7 or that of steps SC6 and SC7. Therefore, these steps SD1–SD7 will not be described.

If the amount of engine overshoot $\Delta N_{EOV}$ is smaller than the threshold value A, step SD7 is followed by step SD8 to reset a flag F2 to "0". If the amount of engine overshoot $\Delta N_{EOV}$ is equal to or larger than the threshold value A, step SD7 is followed by step SD9 to set the flag F2 to "1". When the flag F2 is set at "1", this flag F2 indicates that the amount of engine overshoot $\Delta N_{EOV}$ has reached or exceeded the threshold value A during the clutch-to-clutch shift-up action of the transmission 14.

Steps SD8 and SD9 are followed by steps SD10 and SD11 corresponding to the learning shift-point compensating means 160. These steps SD10 and SD11 are identical with steps SA8 and SA9 of FIG. 11 or steps SC8 and SC9 of FIG. 16. That is, if the highest engine speed $N_{EMAX}$ during the clutch-to-clutch shift-up action is determined in step SD10 to be higher than the reference value $N_{EA}$, the shift-up boundary vehicle speed is lowered by an amount α suitable for reducing the highest engine speed $N_{EMAX}$ to the reference value $N_{EA}$. If the highest engine speed $N_{EMAX}$ is equal to or lower than the reference value $N_{EA}$, step SD10 is followed by step SD12 to reset a flag F3 to "0". Step SD11 which is implemented if the highest engine speed $N_{EMAX}$ is higher than the reference value $N_{EA}$ is followed by step SD13 to set the flag F3 to "1". When the flag F3 is set at "1", this flag F3 indicates that the highest engine speed $N_{EMAX}$ is higher than the reference value $N_{EA}$.

The control routine of FIG. 19 is initiated with step SE1 to read and process the input signals. Step SE1 is followed by step SE2 to determine whether the flag F2 is set at "1". If a negative decision (NO) is obtained in step SE2, one cycle of execution of the routine of FIG. 19 is terminated. If an affirmative decision (YES) is obtained in step SE2, the control flow goes to step SE3 to determine whether the flag F3 is set at "0". If a negative decision (NO) is obtained in step SE3, one cycle of execution of the routine is terminated. If an affirmative decision (YES) is obtained in step SE3, the control flow goes to step SE4 to activate the hydraulic pressure compensating means 162 to effect learning compensation of the releasing pressure $P_{B3}$ of the brake B3 on the basis of the amount of engine overshoot $\Delta N_{EOV}$ during the clutch-to-clutch shift-up action of the transmission 14. That is, when the highest engine speed $H_{EMAX}$ is equal to or lower than the reference value $N_{EA}$ while the amount of engine overshoot $\Delta N_{EOV}$ is equal to or larger than the threshold value A, the operation of the hydraulic pressure compensating means 162 is initiated or resumed. Namely, the affirmative decision (YES) in step SE3 indicates that the highest engine speed $N_{EMAX}$ has been lowered to the reference value $N_{EA}$ during successive clutch-to-clutch shift-up actions of the transmission 14, owing to the effect of the compensation of the shift-up boundary line (shift-up boundary vehicle speed) by the learning shift-point compensating means 160.

In the present fourth embodiment, steps SD10 and SD11 corresponding to the learning shift-point compensating means 160 are implemented irrespective of whether the negative or affirmative decision is obtained in step SD7. If the engine overshoot amount $\Delta N_{EOV}$ is determined in step SE2 to be equal to or larger than the threshold value A and if the highest engine speed $N_{EMAX}$ during the clutch-to-clutch shift-up action is determined in step SE3 to be lowered down to the reference value $N_{EA}$, the operation of the hydraulic pressure compensating means 162 is operated in step SE4. This arrangement assures increased stability in the learning compensation of the shift-up boundary line by the learning shift-point compensating means 160, without an adverse influence of a change in the engine speed $N_E$ which would occur if the releasing pressure $P_{B3}$ was compensated by the hydraulic pressure compensating means 162 during operation of the compensating means 160. It will be understood that steps SE2 and SE3 correspond to the resuming means 176 for resuming the operation of the hydraulic pressure compensating means 162 in step SE4 when it is determined in steps SE2 and SE3 that the highest engine speed $N_{EMAX}$ has been lowered to the reference value $N_{EA}$, that is, when it is determined that the operation of the learning shift-point compensating means 160 has been terminated. Steps SE2 and SE3 may also be considered to correspond to compensation coordinating means for controlling the hydraulic pressure compensating means 162 depending upon an effect achieved by the learning shift-point compensating means 160 to lower the highest engine speed $N_{EMAX}$ or reduce the engine overshoot amount $\Delta N_{EOV}$.

While the present invention has been described above in detail in its presently preferred embodiments by reference to the accompanying drawings, for illustrative purpose only, it is to be understood that the invention is not limited to the details of the illustrated embodiments, but may be otherwise embodied.

In the illustrated embodiments, the hydraulic pressure compensating means 162 is adapted to effect learning compensation of the releasing pressure $P_{B3}$ of the brake B3 or the engaging pressure $P_{B2}$ of the brake B2 so as to reduce the amount of overshoot of the engine speed or the amount of tie-up of the brakes B2, B3 to within a predetermined permissible range if the releasing or engaging pressure $P_{B3}$, $P_{B2}$ is compensated in the next clutch-to-clutch shift-up action of the transmission. However, this learning compensation for the next clutch-to-clutch shift-up action is not essential. That is, the hydraulic pressure compensating means 162 may be modified to effect real-time compensation of the pressure $P_{B3}$, $P_{B2}$ during the present clutch-to-clutch shift-up action.

While the automatic transmission 14 in the illustrated embodiments is arranged to effect the clutch-to-clutch shift-up action from the second-speed position to the third-speed position by releasing or disengagement of the brake B3 and engagement of the brake B2, the other frictional coupling devices may be used for the 2→3 clutch-to-clutch shift-up action, or the clutch-to-clutch shift-up action may take place between the other operating positions of the transmission. For example, the transmission may be adapted to effect a shift-up action from the first-speed position to the second-speed position.

Although the mutually independent engine and transmission controller 76, 78 are used in the illustrated embodiment, a single controller may be used for controlling both the engine and the transmission.

In the illustrated embodiments, the amount of engine overshoot $\Delta N_{EOV}$ is calculated according to the equation $\Delta N_{EOV} = (N_E - N_{OUT} \times i_2)$, the engine speed $N_E$ in this equation may be replaced by the speed $N_{IN}$ of the input shaft 20 of the transmission 14, namely, speed $N_{C0}$ of the clutch C0 of the first transmission unit 30.

It is to be understood that the present invention may be embodied with various other changes, modifications and improvements, which may occur to those skilled in the art, in the light of the foregoing teachings, without departing from the spirit and scope of the invention defined in the following claims.

What is claimed is:

1. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift-up action of said transmission from one of said operating positions to another of said operating positions, said shift control apparatus comprising:

learning shift-point compensating means for effecting learning compensation of a shift-up boundary line used for determining whether said clutch-to-clutch shift-up action should take place, so that a speed of said engine does not exceed a predetermined upper limit during said clutch-to-clutch shift-up action if said shift-up action takes place according to the compensated shift-up boundary line, said shift control apparatus further comprising:

engine overshoot detecting means for detecting an amount of overshoot of the speed of said engine during said clutch-to-clutch shift-up action of said automatic transmission; and inhibiting means for determining whether said amount of overshoot of the speed of said engine is larger than a predetermined threshold, and inhibiting an operation of said learning shift-point compensating means if said amount of overshoot is larger than said predetermined threshold.

2. A shift control apparatus according to claim 1, further comprising hydraulic pressure compensating means for compensating at least one of a releasing pressure of said one frictional coupling device and an engaging pressure of said other frictional coupling device, so that said amount of overshoot of the speed of said engine detected by said engine overshoot detecting means during said clutch-to-clutch shift-up action of said automatic transmission is reduced to within a predetermined permissible range.

3. A shift control apparatus according to claim 2, wherein said inhibiting means permits an operation of said hydraulic pressure compensating means while the operation of said learning shift-point compensating means is inhibited.

4. A shift control apparatus according to claim 1, wherein said learning shift-point compensating means includes determining means for determining a highest value of the speed of said engine during said clutch-to-clutch shift-up action of said automatic transmission, and changing means for changing said shift-up boundary line by an amount necessary to reduce said highest value of the speed of the engine to a predetermined reference value lower than said upper limit when said clutch-to-clutch shift-up action of said automatic transmission takes place according to the shift-up boundary line as changed by said changing means.

5. A shift control apparatus according to claim 4, further comprising shift control means for effecting a shifting determination as to whether said clutch-to-clutch shift-up action of said automatic transmission should take place, said shifting determination being effected on the basis of a currently detected value of a load acting on said engine and a currently detected value of a running speed of said motor vehicle and according to said shift-up boundary line which represents a predetermined relationship between said load acting on said engine and said running speed.

6. A shift control apparatus according to claim 5, wherein said learning shift-point compensating means reduces a shift-up boundary value of said running speed of said motor vehicle when said load acting on said engine is higher than a predetermined threshold.

7. A shift control apparatus according to claim 1, wherein said inhibiting means changes said predetermined threshold as a function of a currently detected value of a load acting on said engine.

8. A shift control apparatus for controlling an automatic transmission of a motor vehicle having an engine, said transmission having a plurality of operating positions and including two hydraulically operated frictional coupling devices one and the other of which are released and engaged, respectively, to effect a clutch-to-clutch shift-up action of said transmission from one of said operating positions to another of said operating positions, said shift control apparatus comprising:

learning shift-point compensating means for effecting learning compensation of a shift-up boundary line used for determining whether said clutch-to-clutch shift-up action should take place, so that a speed of said engine does not exceed a predetermined upper limit during said clutch-to-clutch shift-up action if said shift-up action takes place according to the compensated shift-up boundary line;

hydraulic pressure compensating means for compensating a releasing pressure of said one frictional coupling device so as to permit said clutch-to-clutch shift-up action of said automatic transmission to be effected smoothly; and compensating coordinating means for controlling one of said learning shift-point compensating means and said hydraulic pressure compensating means depending upon an operation of the other of said learning shift-point compensating means and said hydraulic pressure compensating means.

9. A shift control apparatus according to claim 8, wherein said compensation coordinating means commands said hydraulic pressure compensating means to operate while inhibiting an operation of said learning shift-point compensating means when an amount of overshoot of a speed of said engine is larger than a predetermined threshold, said compensation coordinating means permitting the operation of said learning shift-point compensating means when said amount of overshoot of the speed of the engine has been reduced below said predetermined threshold by an operation of said hydraulic pressure compensating means.

10. A shift control apparatus according to claim 8, wherein said compensation coordinating means comprises determining means for determining whether a compensation of said releasing pressure of said one frictional coupling device by said hydraulic pressure compensating means is possible when an amount of overshoot of a speed of said engine is larger than a predetermined threshold, said compensation coordinating means commanding said learning shift-point compensating means to operate if said determining means determines that the compensation by said hydraulic pressure compensating means is possible.

11. A shift control apparatus according to claim 10, wherein said compensation coordinating means further comprises estimating means operable if said determining means determines that the compensation by said hydraulic pressure compensating means is possible, said estimating means estimating a highest speed of said engine which is expected if said releasing pressure of said one frictional coupling device is compensated by said hydraulic pressure compensating means, said compensation coordinating means commanding said learning shift-point compensating means to change said shift-up boundary line so that said highest speed of the engine estimated by said estimating means coincides with a predetermined reference value when said clutch-to-clutch shift-up action of said automatic transmission takes place according to said shift-up boundary line as compensated by said learning shift-point compensating means, with said releasing pressure being compensated by said hydraulic pressure compensating means.

12. A shift control apparatus according to claim 8, wherein said compensation coordinating means comprises determining means for determining whether an amount of overshoot of a speed of said engine is larger than a predetermined threshold, and commanding means for commanding said learning shift-point compensating means to operate to change said shift-up boundary line while inhibiting an operation of said hydraulic pressure compensating means when said amount of overshoot of the speed of said engine is larger than said predetermined threshold.

13. A shift control apparatus according to claim 12, wherein said compensation coordinating means further comprises resuming means for determining whether an operation of said learning shift-point compensating means has been terminated, and commanding said hydraulic pressure compensating means to resume an operation to compensate said releasing pressure of said one frictional coupling device.

14. A shift control apparatus according to claim 13, wherein said resuming means comprises means for determining whether a highest speed of said engine during said clutch-to-clutch shift-up action of said automatic transmission has been reduced to a predetermined reference value as a result of the learning compensation of said shift-up boundary line by said learning shift-point compensating means, said resuming means determining that the operation of said learning shift-point compensating means has been terminated, if said highest speed of the engine during said clutch-to-clutch shift-up action has been reduced to said predetermined reference value.

15. A shift control apparatus according to claim 8, further comprising shift control means for effecting a shifting determination as to whether said clutch-to-clutch shift-up action of said automatic transmission should take place, said shifting determination being effected on the basis of a currently detected value of a load acting on said engine and a currently detected value of a running speed of said motor vehicle and according to said shift-up boundary line which represents a predetermined relationship between said load acting on said engine and said running speed.

16. A shift control apparatus according to claim 15, wherein said learning shift-point compensating means reduces a shift-up boundary value of said running speed of said motor vehicle when said load acting on said engine is higher than a predetermined threshold.

\* \* \* \* \*